United States Patent
Raguin et al.

(10) Patent No.: US 11,531,756 B1
(45) Date of Patent: Dec. 20, 2022

(54) APPARATUS FOR DIRECTING PRESENTATION ATTACK DETECTION IN BIOMETRIC SCANNERS

(71) Applicant: HID GLOBAL CORPORATION, Austin, TX (US)

(72) Inventors: Daniel H. Raguin, North Palm Beach, FL (US); Kenton Lee Whitaker, Fremont, CA (US)

(73) Assignee: HID Global Corporation, Austin, TX (US)

( * ) Notice: Subject to any disclaimer, the term of this patent is extended or adjusted under 35 U.S.C. 154(b) by 515 days.

(21) Appl. No.: 15/926,928

(22) Filed: Mar. 20, 2018

Related U.S. Application Data

(60) Provisional application No. 62/473,922, filed on Mar. 20, 2017.

(51) Int. Cl.
  *G06F 21/56* (2013.01)
  *G06V 40/70* (2022.01)

(52) U.S. Cl.
  CPC .......... *G06F 21/566* (2013.01); *G06F 21/567* (2013.01); *G06V 40/70* (2022.01); *G06F 2221/031* (2013.01)

(58) Field of Classification Search
  None
  See application file for complete search history.

(56) References Cited

U.S. PATENT DOCUMENTS

| | | |
|---|---|---|
| 5,164,992 A | 11/1992 | Turk et al. |
| 5,233,404 A | 8/1993 | Lougheed et al. |
| 5,291,560 A | 3/1994 | Daugman |
| 5,321,501 A | 6/1994 | Swanson et al. |
| 5,325,442 A | 6/1994 | Knapp |
| 5,493,109 A | 2/1996 | Wei et al. |
| 5,619,586 A | 4/1997 | Sibbald |

(Continued)

FOREIGN PATENT DOCUMENTS

| | | |
|---|---|---|
| WO | WO2001/001329 | 1/2001 |
| WO | WO2016/055253 | 4/2016 |

OTHER PUBLICATIONS

Cheng, Y. et al., Artificial fingerprint recognition by using optical coherence tomography with autocorrelation analysis, Applied Optics, vol. 45, No. 36, pp. 9238-9245, Dec. 20, 2006.

(Continued)

*Primary Examiner* — Thu N Nguyen
(74) *Attorney, Agent, or Firm* — Schwegman Lundberg & Woessner, P.A.

(57) ABSTRACT

An apparatus for biometric security having a biometric scanner for capturing over a first field of view image data representative of one or more biometric objects associated with a subject, and a presentation attack detection system for capturing over a second field at one or more locations along the subject information indicative of presence of the one or more biometric objects. One or more processors utilizes the image data received from the biometric scanner to select such one or more locations, and to direct the second field of view of the presentation attack detection system to obtain the information along one or more of the selected one or more locations, and to determine in accordance with the information when the first field of view contains a true or fake presentation to the biometric scanner.

18 Claims, 11 Drawing Sheets

(56) References Cited

U.S. PATENT DOCUMENTS

| | | | |
|---|---|---|---|
| 5,751,836 A | 5/1998 | Wildes et al. | |
| 5,991,429 A | 11/1999 | Coffin et al. | |
| 6,057,920 A | 5/2000 | Fercher et al. | |
| 6,175,641 B1 | 1/2001 | Kallo et al. | |
| 6,226,395 B1* | 5/2001 | Gilliland | B23K 9/1274 |
| | | | 348/90 |
| 6,247,813 B1 | 6/2001 | Kim et al. | |
| 6,714,665 B1 | 3/2004 | Hanna et al. | |
| 6,940,891 B2 | 9/2005 | Clary et al. | |
| 6,983,062 B2 | 1/2006 | Smith | |
| 7,277,562 B2 | 10/2007 | Zyzdryn | |
| 7,440,590 B1 | 10/2008 | Hassebrook et al. | |
| 7,567,690 B2 | 7/2009 | Foundeur et al. | |
| 7,747,044 B2 | 6/2010 | Baker et al. | |
| 7,804,984 B2 | 9/2010 | Sidlauskas et al. | |
| 7,936,462 B2 | 5/2011 | Jiang et al. | |
| 8,090,163 B2 | 1/2012 | Schuckers et al. | |
| 8,391,590 B2 | 3/2013 | Yalla et al. | |
| 8,494,829 B2 | 7/2013 | Teixeira | |
| 8,687,856 B2 | 4/2014 | Bower et al. | |
| 8,768,014 B2 | 7/2014 | Du et al. | |
| 9,163,936 B1 | 10/2015 | Ulmer et al. | |
| 9,165,177 B2 | 10/2015 | Burcham et al. | |
| 9,245,167 B2 | 1/2016 | Carver et al. | |
| 9,280,695 B2 | 3/2016 | Zyzdryn et al. | |
| 9,396,382 B2 | 7/2016 | Troy et al. | |
| 9,400,916 B1 | 7/2016 | Brownlee | |
| 9,489,560 B2 | 11/2016 | Balch et al. | |
| 9,784,561 B2 | 10/2017 | Jiang et al. | |
| 9,892,306 B2 | 2/2018 | Hillmann et al. | |
| 10,018,464 B2 | 7/2018 | Boles et al. | |
| 2012/0057011 A1 | 3/2012 | Horng et al. | |
| 2012/0147356 A1* | 6/2012 | Necsoiu | G01B 11/007 |
| | | | 356/3 |
| 2012/0300988 A1* | 11/2012 | Ivanov | G06K 9/0002 |
| | | | 382/115 |
| 2014/0049373 A1* | 2/2014 | Troy | G06K 9/00093 |
| | | | 340/5.83 |
| 2015/0241202 A1* | 8/2015 | Jiang | G01B 9/02083 |
| | | | 356/479 |
| 2016/0132710 A1* | 5/2016 | Setterberg | G06T 7/0014 |
| | | | 382/124 |
| 2017/0083742 A1* | 3/2017 | Lamare | G01B 9/02087 |
| 2017/0085813 A1 | 3/2017 | Reinhold et al. | |
| 2017/0109512 A1* | 4/2017 | Bower | G06F 21/32 |

OTHER PUBLICATIONS

Auksorius, E. et al., Fingerprint imaging from the inside of a finger with full-field optical coherence tomography, Biomedical Optics Express, vol. 6, No. 11, pp. 4465-4471, Nov. 1, 2015.
Cross Match Technologies, Inc., Verifier® Sentry, 2015.
Cross Match Technologies, Inc., Guardian® Module, 2016.
Cross Match Technologies, Inc., Guardian® 100, 2016.
HID Global Corporation, Lumidigm® V-Series Fingerprint Sensors, 2016.
Hamamatsu Photonics K.K., Micro-spectrometer, C12666MA, printout from https://web.archive.org/web/20160116161157/http://www.hamamatsu.com:80/jp/en/product/category/5001/4016/012666MA/index.html, Jan. 16, 2016.
Beisley, A., "Spectral Detection of Human Skin in VIS-SWIR Hyperspectral Imagery without Radiometric Calibration", Dept. Air Force Thesis, 2012.
Cambridge Technology, Ideal Scanning Solutions for Processing Large Areas, printout from https://web.archive.org/web/20161102190526/http://www.cambridgetechnology.com:80/products/3-axis-scan-heads, Nov. 2, 2016.
Cambridge Technology, 62xxH Series Galvanometer Scanners, 2016.
NexID Biometrics, Liveness Detection SDK, printout from https://web.archive.org/web/20161103115025/http://nexidbiometrics.com/technology/liveness-detection-sdk/, Nov. 3, 2016.
Thorlabs Inc., Callisto 930 nm OCT Imaging System, printout from https://web.archive.org/web/20160909054413/https://www.thorlabs.com/newgrouppage9.cfm?objectgroup_id=3779, Sep. 9, 2016.
Optotune AG, Dual axis mirror with position feedback MR-15-30, printout from https://www.optotune.com/products/beam-steering/2d-mirror-mr-15-30, 2016.

* cited by examiner

APPARATUS FOR DIRECTING PRESENTATION ATTACK DETECTION IN BIOMETRIC SCANNERS

This Application claims the benefit of U.S. Provisional Patent Application No. 62/473,922, filed Mar. 20, 2017, which is herein incorporated by reference.

FIELD OF THE INVENTION

The present invention relates to an apparatus (system and method) for directing presentation attack detection in biometric scanners, and in particular to an apparatus for directing presentation attack detection to one or more locations in the field of view of a biometric scanner. The present invention is useful in that by directing presentation attack detection to selected locations in the field of view of the biometric scanner indicative of the presence of biometric features reduces the time for presentation attack detection to only a fraction of the entire field of view of the biometric scanner, thereby enabling efficient presentation attack detection of potential object(s) mimicking a living human biometric.

BACKGROUND ON THE INVENTION

As the use of biometrics becomes increasingly ubiquitous in today's market, there is an increased threat of individuals attempting to circumvent implemented biometric security measures. With items being secured by biometrics (e.g., access to a government building, a border crossing, computer system, computer terminal, a bank account, etc.) becoming increasingly valuable, it is desirable to detect presentation attacks (PAs) on a biometric detection system. Often PAs are referred to as a "spoof", however PA as used herein is currently the more generally accepted term and refers to a presentation to biometric detecting systems that is fabricated to mimic that of a living human biometric. In other words, a true or real presentation or biometric presentation means the biometric presentation is coming from a human, while a false or fake presentation or biometric presentation means that the presentation is considered fabricated to mimic that of a human biometric, but is not a human biometric and preferentially not a live human biometric. Often the physical mechanism by which a PA is implemented (e.g., a membrane of silicone with an imprint of a fingerprint or a glass eye ball) has been termed a "spoof", however the more current terminology is an "artifact" or a presentation attack instrument (PAI).

In the case of a biometric security system using the biometric modality of fingerprints, presentation attacks can come in the form of fake fingers complete with fingerprints (e.g., phantoms), thin membranes containing a fingerprint that are affixed to a real fingerprint, as well as dead fingers. Technology has been proposed for fingerprint presentation attack detection (PAD). These fingerprint PAD technologies include the sensing of electrical properties of an object touching the fingerprint platen such as the art described in U.S. Pat. No. 7,567,690 by J-C. Foundeur et al., as well as U.S. Pat. No. 6,175,641 by Peter Kallo et al. These patents describe the use of impedance to distinguish certain PAIs from true fingers because the impedance of the PAI does not match that of a real finger. For example, the conductivity of the PAI may be too low such as in the case of a silicone fingerprint artifact. However, for PAI's that have a water content similar to that of human skin, it is difficult to distinguish these PAIs from real fingers.

Another finger PAD technology is the use of optical scatter off of an object that touches the platen of a fingerprint scanner, such as described in U.S. Pat. No. 9,400,916 by K. Brownlee. This involves illuminating an object touching the fingerprint scanner's platen at one location of the object, and detect the amount and distribution of light scattered at other locations due to internal scatter within the object. Brownlee teaches to identify PAs if they do not have similar optical scatter and absorption properties as real skin. This technique can identify very clear or opaque fingerprint artifacts, but has limited use for identifying artifacts that are modeled to have similar scatter properties as skin.

U.S. Pat. No. 9,396,382 by Troy et al. provides a system and method for a biometric image sensor with spoofing detection using 3D (three-dimensional) scanning system based upon structured light imaging (SLI), but does not utilize the 3D topology measured of the biometric presentation in order to identify whether or not that presentation is true or false. Rather Troy et al. describes the use of captured color image data to determine if the reflectivity as well as the color spectrum of the object being presented is consistent with that of normal human skin. An explanation regarding how SLI can be implemented to capture the topology of an object may be found in U.S. Pat. No. 7,440,590 by Hassebrook et al.

In the case of a biometric security system using the biometric modality of the iris, presentation attacks can come in the form of a photo of an eye, a printed iris on contact lens or a glass eye. International PCT Publication No. WO 01/01329 A1 by Seal et al. describes different methods of potentially distinguishing if the iris presentations are true or false. In one method in Seals et al., light substantially parallel to the imaging axis illuminates the eye and the appearance of red-eye is observed. For example, there will be no red-eye effect if the iris presentation is a printed image, or even a glass eyeball with iris printed behind the pupil. Another method in Seal et al. is the observance of an optical effect with polarized light that Seal et al. terms the corneal cross that can be observed in a real eye due to the anisotropy of human eye, but will not be observed with a photo of an eye. A further method of Seal et al. uses is projected structured light. By illuminating the eye with structured light (a distinctive pattern of one or more straight and parallel lines), Seal et al. describes that one can identify if a subject is presenting a real iris or presenting a fake iris where the iris is printed onto a contact lens. In the case of a real iris the structured light pattern is straight across the iris, but in the case of a fake iris the structured light patterns are curved across the iris since now the fake iris is not flat, but rather curved to the shape of the subject's cornea.

Another method of determining the presence of false biometric presentations for both fingerprints as well as for iris is the use of optical coherence tomography (OCT). As described by Cheng and Lain, "Artificial fingerprint recognition by using optical coherence tomography with autocorrelation analysis," Appl. Opt. 45, pp. 9238-9245 (2006), by penetrating and imaging the material beneath the top layer fingerprint OCT can be used to detect the boundary between a silicone fingerprint overlay and real finger tissue. OCT has also been used for the identification of the iris as described, for example, in U.S. Pat. No. 8,687,856 by Bower et al.

Often a disadvantage of PAD technologies, such as in OCT, is that they are slow or expensive to implement across a large field-of-view (FOV) of a biometric scanner. Thus, it would be desirable to readily incorporate slow or expensive PAD technologies in biometric detection systems to improve the detection of PAs to avoid unlawful access to environments protected by such systems, but without requiring the time-consuming process of performing presentation attack detection over the entire FOV of the biometric scanner.

SUMMARY OF THE INVENTION

Accordingly, one object of the present invention is to provide an apparatus having a biometric scanner that can generate an image over a field of view (FOV) and incorporates a presentation attack detection (PAD) system directed to examine one or more locations within the biometric scanner's FOV.

A further object of the present invention is to provide an apparatus having a biometric scanner in which the scanner's FOV may be analyzed to determine location(s) of potential presence of a biometric presentation and where the PAD system is directed to scan all or a subset of these locations to determine the likelihood that the detected biometric presentation is true or false.

Briefly described, the present invention embodies an apparatus having a biometric scanner for capturing over a first field of view image data representative of one or more biometric objects associated with a subject, and a presentation attack detection (PAD) system for capturing over a second field of view at one or more locations along the subject indicative of presence of one or more biometric objects. One or more processers of the apparatus, which may be in the housing of the apparatus and/or in an optional computer, controls the operation of the biometric scanner and PAD system. The one or more processors utilize the image data received from the biometric scanner to select such one or more locations within the first field of view indicative of the presence of biometric features used by the biometric scanner for biometric detection, directs the second field of view of the PAD system to one or more of the selected one or more locations to obtain the information related to the one or more biometric objects associated with the subject, and such information is then used to determine when the first field of view contains a fake presentation to the biometric scanner, and hence constitutes a possible presentation attack.

The biometric scanner may be a fingerprint scanner, an iris scanner, a face scanner, or other type of biometric scanner for capturing biometric object(s), and the one or more biometric objects in the first field of view of the image data captured by the biometric scanner comprise at least one or more fingertips, one or more irises, or face, respectively. The image data captured may be a two-dimensional image of the biometric objects and is stored in memory of, or accessible to, the one or more processors. In the preferred embodiment, the PAD system utilizes an optical coherence tomography (OCT) scanner, and the information obtained is a scanned one-dimensional (1D), two-dimensional (2D), or three-dimensional (3D) image, where one dimension of the image represents depth into the biometric object presented. A 1D image provides depth data (for example representing a depth of 1 or 2 mm deep) collected along a z axis from a single x-y point preferably at or near the surface of the object, and is commonly termed an A-scan. A collection of A-scans along a line in the x-y plane of the biometric object, commonly termed a B-scan, is a cross-sectional view in depth of the object being presented to the scanner. A 3D image is a collection of B-scans that maps at least a portion of the biometric object (i.e., presentation) in x and y as well as in depth z and is commonly termed an en face or C-scan. When the biometric objects are fingers, locations along one or more fingertip may be selected by the one or more processors, and scanned by the PAD system using OCT. The one or more processors store this image in memory and digital image processing analyses the grayscale values to detect a boundary, such as a reflectively spike or change, indicative of a fingerprint overlay material, such as silicone, at the interface with the real tissue surface (as described in the earlier cited Cheng and Larin Appl. Opt. 2006 paper), or the ridges and valleys associated with a fingerprint at the surface of the object disappear at depths into the tissue and do not reappear as would be indicative of the presence of sub dermal fingerprints that humans have. For example, the one or more processors may detect the presence of subdermal fingerprints by using a 1D Fourier transform of different depth slices of an OCT B-scan images and looking at the power spectrum for Fourier coefficients at the appropriate range of frequencies corresponding to a typical human fingerprint ridge-valley frequency. The PAD system in the case of an iris or face scanner being the biometric scanner can similarly use an OCT scanner to capture A-scan, B-scan, or C-scan images for use by the one or more processors of the apparatus in determining a fake presentation to the iris or face scanner. The OCT scanner may take a single A-scan, B-scan, or C-scan image at each selected location along the biometric objects, but multiple images representing distinct A-scans, B-scans, and/or C-scans may be taken along each selected location, which may be in an area/region along the object, in which data from each scan provides information analyzed for fake presentation by the one or more processors in the apparatus.

However, other modalities of PAD may be performed, such as a PAD system having a spectral sensing system for measuring spectral data, such as a spectral signature of the object, and the one or more processors using such signature to determine a fake or real biometric in accordance with the biometric expected to be in view of the biometric scanner. Less preferably, the PAD system in the case of fingerprint scanner providing the biometric scanner may obtain information in the form of impedance to distinguish between fake and real fingers. Regardless of the modality of the PAD system, by calibrating the processing of the one or more processors to analyze PAD obtained information for characteristics associated with materials that mimic living human biometric objects, such as patterns, structures (e.g., sweat glands, veins, or pores), color, or lack of red eye, as may be determined by the particular biometric security application of apparatus, real and fake biometric objects can be differentiated so that presentation attack detection is achieved at least to a desired level of confidence (e.g., a presentation attack score is generated and depending upon the false detect versus true detect rates desired, the threshold PA score for which a presentation is labelled as an attack can be set). Thus, the information provided by the PAD system to the one or more processors of the apparatus is indicative of the presence of one or more biometric objects of the captured image data in the field of view of the biometric scanner, and is used by such one or more processors to determine if the presentation to the biometric scanner is fake.

The advantage of the apparatus and biometric detection systems incorporating same, is that PAD is generally a slow process compared to biometric scanning, especially for OCT scanning, thus selecting the locations being scanned for PAD to those indicative of presence of biometric features used by the biometric scanner for biometric detection greatly reduces the time for PAD over other approaches that require PAD over the entire field of view of the biometric scanner or even over preset area(s) of the field of view where a subject may be told or otherwise guided to position a biometric, such as a finger, iris, hand, or face. Thus, PAD occurs only over a fraction of the field of view of the biometric scanner or such preset area(s) of the field of view, enabling efficient PAD.

One or more of the selected location(s), determined by the one or more processors indicative of the likely presence of biometric features used by the biometric scanner, are scanned by the PAD system in accordance with the modality of the PAD system. To enable such, the second field of view of the PAD system overlaps at least a portion of the first field of view of the biometric scanner, and the first and second fields of view spatially correlate with each other. Preferably, the second field of view substantially overlaps the first field of view. Along each selected location, the PAD system may take one or more data samples or measurements along one or two dimensions in an area associated with the location, or perform volume scanning over the area at the location as in the case of OCT below the surface of the object presumed to have the biometric, to search for characteristics in terms of structures or measurements distinguishing fake and real biometrics. The biometric data from the biometric scanner used by the one or more processors to select location(s) may represent image data which is of the same or lower resolution than needed by the biometric scanner for biometric detection when performing an enrollment, identification or verification of a subject in a biometric detection system that control access to physical and/or electronic environments protected by such system.

For the case of a PAD system that probes the biometric presentation with an optical beam, to direct the PAD system of the above apparatus to desired location(s) within the first field of view, a movable mirror or mirrors may be provided positioned to direct illumination, such as from an OCT scanner, to the selected location(s) within the first field of view, and then collect returned illumination to the OCT scanner for PAD. Other mechanisms may also be used to direct the PAD system to desired location(s) within the first field of view, such as motion mechanics including linear, circular, or angular stages motorized by technology such as DC stepper motors or piezo or solenoid actuators. In one embodiment, stages having motor drive linear slides or sleds may be used for moving the imaging optics or head of the OCT scanner or other PAD system along one or two preferably orthogonal dimensions associated with height and width of the first field of view to image at selected location(s) within the first field of view. However, other mechanisms by which the PAD system may scan the selected locations or areas of the biometric scanner's FOV may be used. Preferably, in order to reduce the mass of the hardware of the apparatus, motion mechanics are provided which move one or more mirrors in order to direct the object beam portion or scanner of the PAD system towards the area of interest to scan.

The biometric scanner may be provided by a fingerprint scanner (contact or non-contact) and the PAD system is an OCT scanner. The biometric scanner may scan one or more fingers and one or more processors identify where the likely fingertip(s) may be in order to direct the OCT to examine those locations. Examination of the fingertips does not necessarily mean that the entire fingertip must be scanned by the PAD systems as may be the case if the information was being used for biometric identification, but rather only a large enough area needs to be scanned in order to ascertain that the fingertip is a true or false presentation.

The biometric scanner may be provided by an iris scanner and the PAD system is an OCT scanner. Based upon cues where an eye is detected in the FOV of the biometric scanner, the OCT scanner is directed to examine only location(s) within that FOV for the presence of a true iris presentation.

The biometric scanner may be provided by a face scanner and the PAD system is an OCT scanner. Based upon the analyzed data of the biometric scanner, likely locations to determine if an artifact is present are selected for the PAD system to examine. These locations may include the iris or eyes of the detected face presentation. However, if a person is wearing a mask or facial feature prosthetics, generally the eyes are untouched and would register as true presentations. Alternatively, the apparatus can direct the PAD system to other features of the face such as the nose, chin or cheekbones which have a higher likelihood of having prosthetics added to these areas to change the subject facial feature geometry and thereby attempt to fool a facial recognition system. The OCT scanner gathers data beneath the surface of an object that is presumed to be a face and by looking for a set of features that may include a combination of sweat pores, sweat ducts, subdermal tissue layers, etc. and comparing this data to what a normal human may have, determine if the face presentation is true or false.

When the PAD system is provided by an OCT scanner, the combination of one or more of the movement of the OCT scanner, a portion of the OCT scanner, and the redirection of the OCT scanner's object beam may be performed in order to scan the determined location(s) of the fingerprint, iris, or face biometric scanner.

As stated earlier, one advantage of the present invention is that the entire FOV of the biometric scanner does not need to be examined to determine if a biometric presentation is true or false. Only a portion of the FOV of the biometric scanner is examined, thereby increasing the speed at which the apparatus, system, or method of the present invention can operate.

As stated earlier, OCT scanning for PAD is slow given that a volume scan is being conducted which ideally should take the same amount of time (or less) than the area scan being conducted by the fingerprint, face, or iris scanner. Thus the biometric scanner is connected to one or more processors operating in accordance with software or program that determines one or more locations within the biometric scanner's FOV that may contain a biometric representation and further to determine locations within the detected biometric representations where the highest likelihood of detecting a false presentation might be. Once these locations are determined, the same or a different electronic processor or processors selects which subset, or if all, of these locations should be scanned using the apparatus' PAD system to determine if such locations contain true or false biometric presentations. By way of example, for a fingerprint scanner, these locations would preferentially be the fingertips since biometric identification is generally based upon the surface topology of the fingertip or first phalange and not the surface topology of the second or third phalanges. For iris scanners, these locations may be iris itself, while for a face scanner, these locations, by way of example may include the nose, cheekbones or mouth in order to detect the presence of prosthetics in these areas that would otherwise alter the facial geometry of the subject's true presentation.

The present invention also embodies a method for biometric security comprising the steps of capturing with a biometric scanner over a first field of view image data representative of one or more biometric objects associated with a subject, selecting one or more locations along the subject using the image data along the subject, directing a scanning head having a second field of view to scan one or more of the selected one or more locations to obtain information indicative of the presence of the one or more biometric objects, and determining in accordance with the information when the first field of view contains a fake presentation to the biometric scanner. The method further either determines identity of the subject using the same image data, or recaptured higher resolution image data if needed, when the determining step indicates a true rather than the fake presentation to the biometric scanner.

The present invention further embodies a system having a biometric scanner, a presentation attack detection (PAD) module, and one or more processors for directing the module to scan certain locations within a field of view of the biometric scanner. The certain locations may be indicative of a presence of biometric features used by the biometric scanner for biometric detection, and the one or more processors determines whether such locations have a possible presentation attack to the biometric scanner. The locations for PAD module scanning is preferably determined based upon biometric data from the biometric scanner.

BRIEF DESCRIPTION OF THE DRAWINGS

The foregoing and other objects, features, and advantages of the invention will become more apparent from a reading of the following description in connection with the accompanying drawings in which.

DETAILED DESCRIPTION OF THE INVENTION

Figure 1:
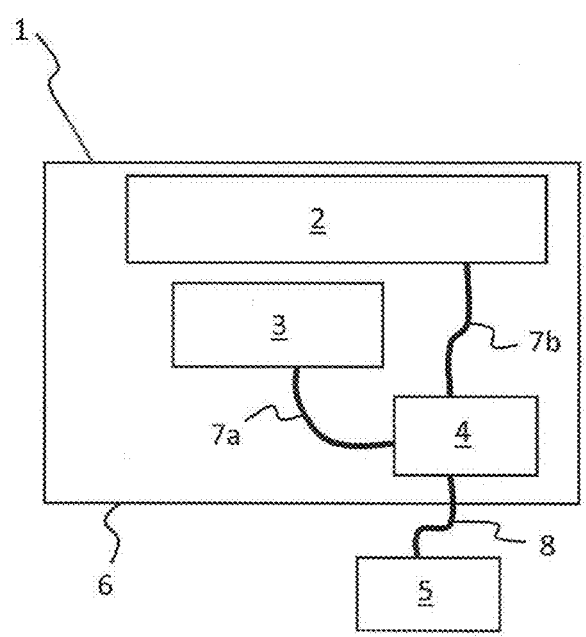
FIG. 1 depicts a schematic diagram of the apparatus of the present invention having a biometric scanner and a presentation attack detection (PAD) system.

Referring to FIG. 1, a block diagram of an apparatus 1 of the present invention is shown. Within the housing 6 of apparatus 1 are a biometric scanner (system or module) 2 and a presentation attack detection (PAD) system (or module) 3 which are connected to a processor 4 via cables 7a and 7b. The biometric scanner 2 and the PAD system 3 may be separate modules as drawn or may be integrated within one another. Biometric scanner 2 represents a scanner that captures over a field of view one or more biometric objects of a human subject, such as a fingerprint(s), face, or iris(es), to provide biometric data, as described below in more detail. The PAD system 3 captures information over another field of view of the same subject, such information being associated with one or more biometric characteristics for use in detecting a presentation attack, as will also be described below in more detail.

Processor 4 controls the biometric scanner 2 and the PAD system 3 and may process all or some of the data received from biometric scanner 2 and PAD system 3. Processor 4 represents one or more processors in housing 6 and/or in an optional computer 5 connected via cable 8 (or wirelessly). For example, the processor 4 may be of an electronic type and may contain one or more data processors (or chips) or a central processing unit (CPU), such as an ARM (Advanced RISC Machine) processor, a digital signal processor (DSP), or a field programmable gate array (FPGA) operating in accordance with software or program. While the term program is used, such program may represent one or more programs stored in memory for use by one or more processors providing processor 4 in system 1. However, other programmable logic device may be used for processor 4, which may represent a module of apparatus 1. Memory may be provided in the processor 4, or in apparatus 1 accessible by the processor 4 for storing such software or program. The computer 5 external of housing 6 may further process the data from biometric scanner 2 and PAD system 3. Computer 5 may have a user-interface (e.g., a software program with a graphical user interface (GUI), a display, and a keyboard and/or a mouse). Power is supplied via battery within, or external power source to, housing 6 to enable electronics of apparatus 1 as typical of fingerprint, iris, or face scanning system which may provide biometric scanner 2, but adapted as described herein by the incorporation of PAD system 3 to provide apparatus 1.

Figure 3:
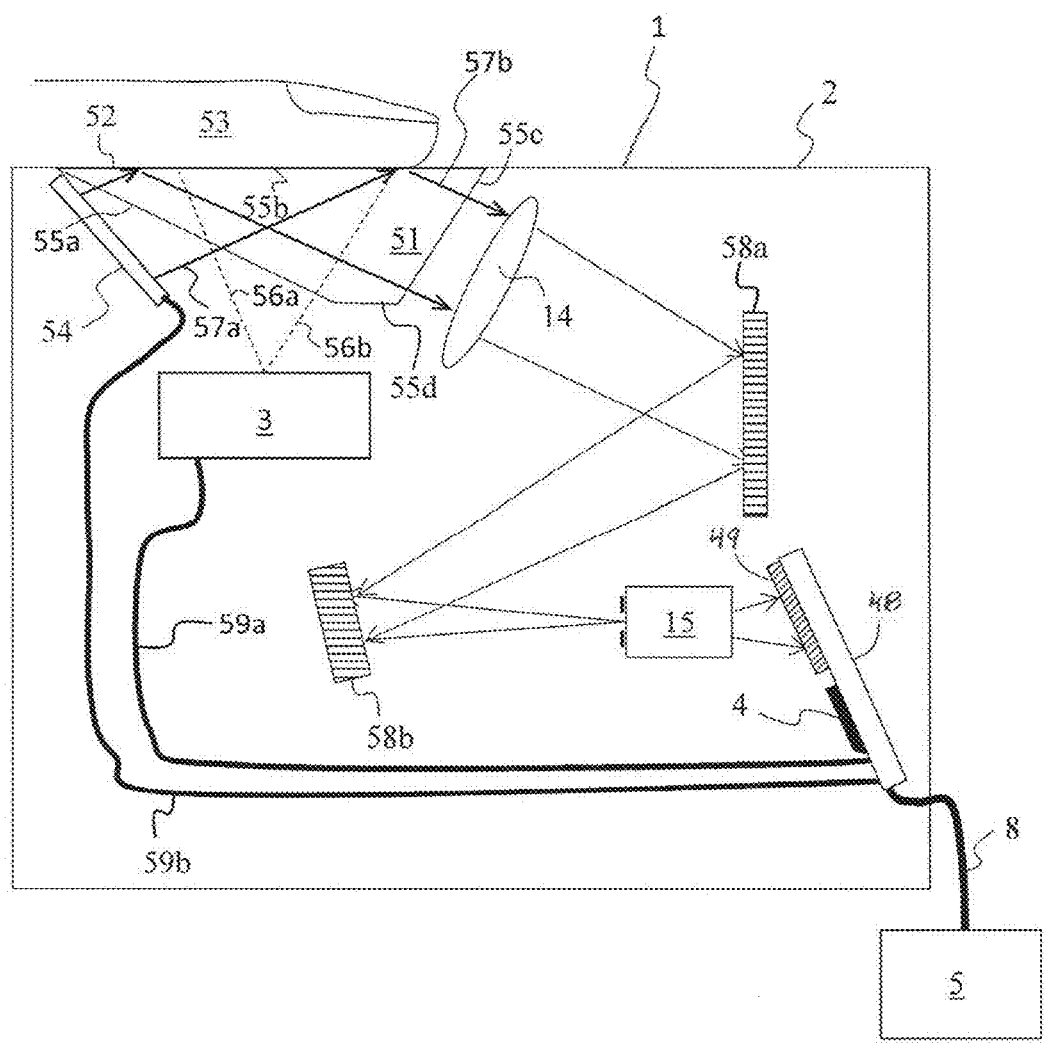
FIG. 3 is a block diagram of apparatus of FIG. 1 in which the biometric scanner is provided by an optical TIR fingerprint scanner.
Figure 6:
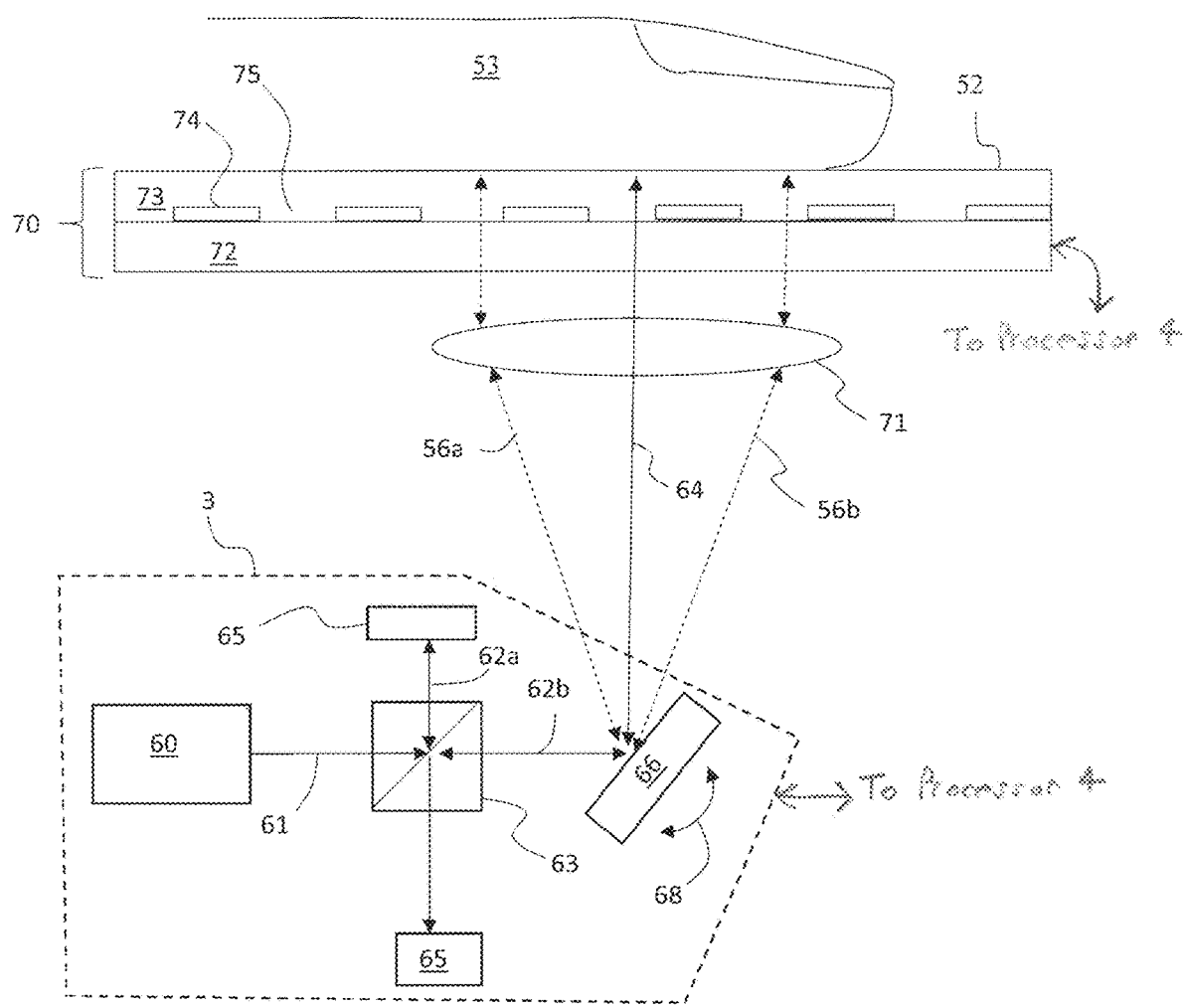
FIG. 6 is a block diagram of the apparatus of FIG. 1 in which the biometric scanner is provided by a TFT fingerprint scanner using the same PAD system as shown in FIG. 5.
Figure 9:
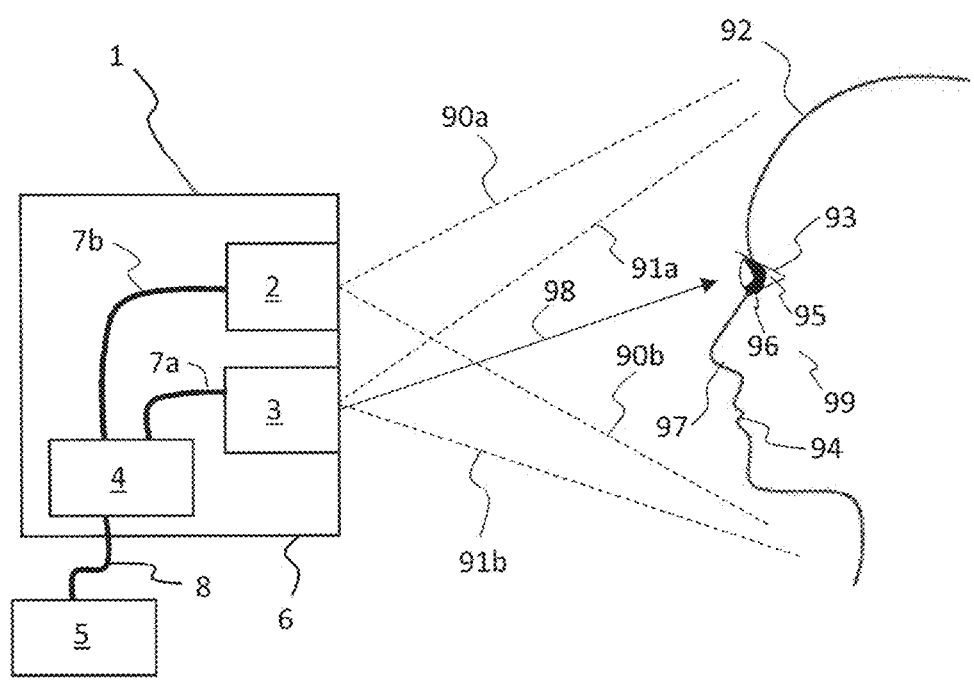
FIG. 9 is a block diagram of apparatus of FIG. 1 in which the biometric scanner is provided by a face or iris scanner.

The biometric scanner 2 may for example be a fingerprint scanner as shown in FIGS. 3 and 6, which operates by scanning an object, i.e., finger(s), placed on a platen within the scanner's field of view (FOV) and captures an image of the object, i.e., one or more fingers (with or without thumb) of a subject, depending on size of the platen. The image captured by the fingerprint scanner for purpose of directing the PAD system 3 may be of the same quality as used for biometric detection, but need not be of such sufficient quality. Rather, the image from the fingerprint scanner need only be of sufficient quality such that the presence of a potential biometric (in this case a finger) can be detected. For example, sufficient quality of fingerprint for the biometric image captured to pass the FBI's Image Quality Standard Appendix F certification. Thus, for the purposes of identifying the potential presence of a fingerprint presentation, the fingerprint scanner may be configured such that it scans at only 100 ppi or 250 ppi rather than their 500 ppi or greater configuration required for a biometric fingerprint identification, but the lower resolution may be sufficient to determine the occurrence of a biometric presentation for PAD system 3. However, if the biometric data provided by the biometric scanner 2 can be used for both identification of location(s) for PAD, and biometric detection, biometric detection may take place in parallel with PAD, if desired, rather than after processor 4 or optional computer 5 has used information from the PAD system 3 to validate the biometric presented as being true. The biometric scanner 2 may for example be face or iris scanner, as shown in FIG. 9.

The present invention is not limited to any particular fingerprint scanner modality or iris or face scanner modality providing biometric scanner 2 in apparatus 1. For example, fingerprint scanner providing biometric scanner 2 may be an optical dark-field TIR fingerprint scanner, such as described by U.S. Pat. No. 5,233,404 (Lougheed et al.), an optical bright-field TIR fingerprint scanner, such as described by U.S. Pat. No. 5,619,586 (Sibbald), a non-contact fingerprint scanners, such as described by U.S. Pat. No. 9,489,560 (Balch et al.), an electrical sensing thin-film transistor (TFT) fingerprint scanner, such as described by U.S. Pat. No. 5,325,442 (Knapp), or U.S. Pat. No. 9,245,167 (Carver et al). Fingerprint scanner which may be used for biometric scanner 2 include an optical prism-based TIR fingerprint scanner, such as the Guardian line of products sold by Cross Match Technologies, Inc. (Palm Beach Gardens, Fla.), a direct-view, non-TIR optical sensor, such as the Lumidigm V302 of HID (Albuquerque, N. Mex.), a non-contact fingerprint scanner, such as that developed by FlashScan3D (San Antonio, Tex.) or Advanced Optical Systems (Huntsville, Ala.), or a thin-film transistor (TFT) based scanner such as that sold by Jenetric (Jena, Germany). Such fingerprint scanner providing biometric scanner 2 may also be a scanner that does not capture a fingerprint through optical means. By way of example, a TFT-based fingerprint scanner may scan fingerprints using capacitance measurements, such as the fingerprint scanner incorporated into the Cross Match Technologies Verifier Sentry. Alternatively, biometric scanner 2 may be an iris or face scanner, such as U.S. Pat. No. 5,751,836 (Wildes et al.), U.S. Pat. No. 6,247,813 (Kim et al.), U.S. Pat. No. 6,714,665 (Hanna et al.), U.S. Pat. No. 5,991,429 (Coffin et al.), or U.S. Pat. No. 5,164,992 (Turk et al.).

Figure 2:
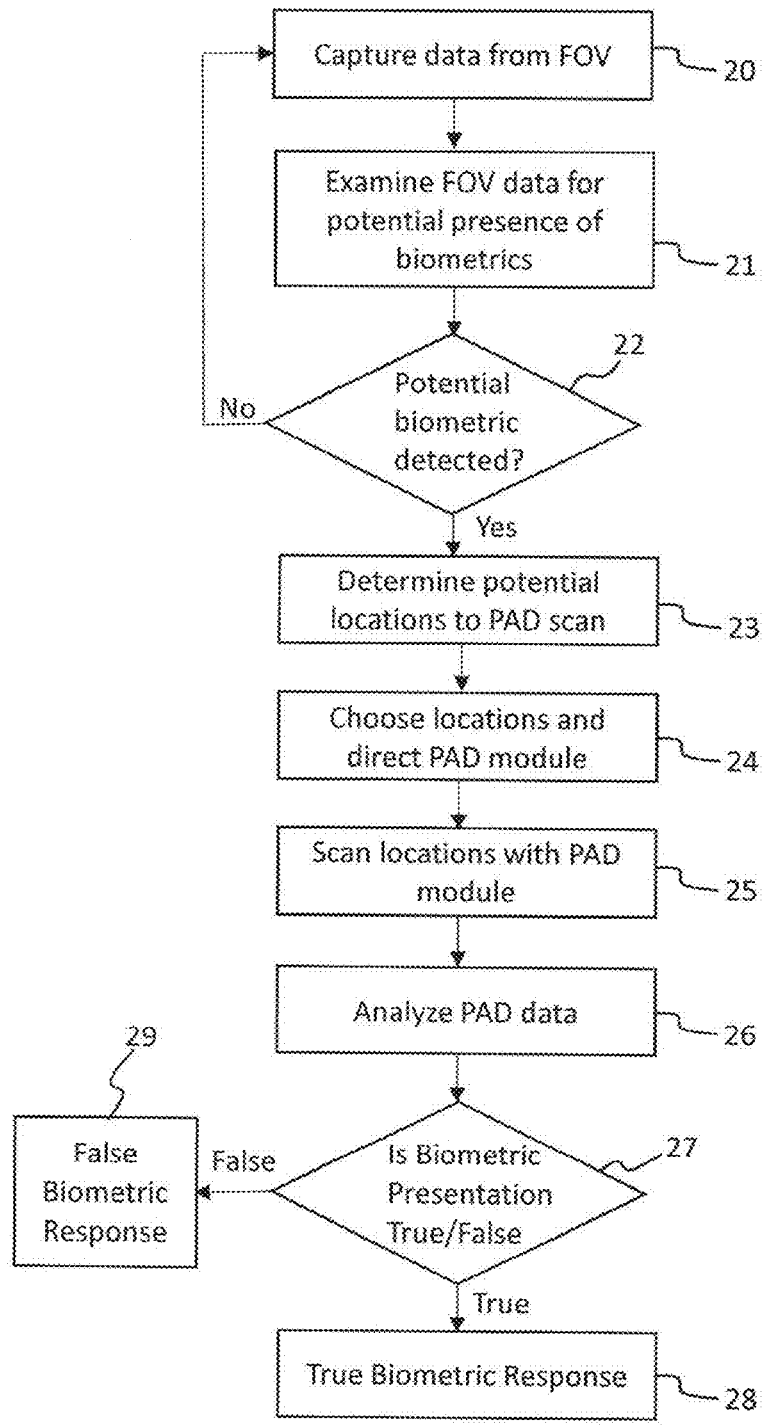
FIG. 2 is a flowchart illustrating the operation of the apparatus of FIG. 1.

The operation of apparatus is shown in the flow chart of FIG. 2. In step 20, the biometric scanner 2 captures biometric data within its field of view (FOV). Depending on the biometric scanner 2, biometric data may be any form of data, such as optical, infrared, radio, radar, capacitance, resistance, impedance, temperature, or pressure. Regardless of the modality of biometric scanner 2 operation, image data captured by the scanner of one or more biometric objects is stored in memory of, or accessible to, processor 4 and/or optional computer 5. In step 21, the stored biometric data is analyzed via processor 4 and/or optional computer 5 to determine if a biometric presentation (i.e., biometric features associated with the biometric scanner 2) may be present. By way of example depending on the type (fingerprint, iris, or face) of the biometric scanner 2, such processing can be through iris location methods described in U.S. Pat. No. 5,751,836 (Wildes et al.) or fingerprint finding methods, such as those of U.S. Pat. No. 9,280,695 (Zyzdryn et al.), U.S. Pat. No. 6,983,062 (Smith), or U.S. Pat. No. 7,277,562 (Zyzdryn), which are herein incorporated by reference. The biometric data captured in step 21 need not be sufficient to capture a biometric presentation capable of performing an enrollment, identification or verification in a biometric identify management system for access to physical and/or electronic environments, but just needs to be sufficient to determine whether or not a biometric presentation is likely to be in the field of view of the biometric scanner 2. For example, in the case of a fingerprint scanner providing biometric scanner 2 normally operating at 500 ppi (the minimum electronic resolution required for FBI certification), biometric scanner 2 may be initially collecting data at 250 ppi or even 100 ppi and merely detecting the presence of a blob or region of data representative of a finger within the data that it collects. Similarly if biometric scanner 2 provides facial capture, the biometric data required to determine if a face is being presented may only be the data required to see the specular reflection of the illumination of biometric scanner 2 or of PAD module 3 coming off of one or both eyes and not necessarily the full detail of data the biometric scanner 2 capable of capturing within its field of view for the purposes of biometric identity management.

At step 22, a decision is made as to if a biometric presence is detected. If no biometric presence detected, step 20 is returned to and the biometric scanner 2 will continue to collect biometric data within its FOV. If there is a biometric presence detected at step 22, the process moves to step 23 where one or more potential locations of a biometric presence are calculated and then in step 24 the actual location(s) to be scanned by PAD system 3 are determined (or selected). The processor 4 or computer 5 is operated to direct the PAD system 3 towards and then scan each of the one or more of those locations (step 25). As will described below in more detail, PAD system 3 may operate by OCT (FIGS. 5 and 6), spectrometry (FIG. 7), or laser scanning (FIG. 13). However, other PAD modalities may be used. One or multiple PAD systems 3 of different modalities may be provided in the same apparatus 1.

The detecting of each of one or more biometric objects in the biometric data of biometric scanner 2 and locations thereof of steps 22 and 23 is performed by processor 4 and/or optional computer 5 by image processing received and stored biometric image data from biometric scanner 2 in the form of a two-dimensional image of pixels of grayscale values to locate boundaries of objects. This may be performed by gradient detection and/or local thresholding (differentiation from the background by a desired grayscale threshold value) to locate boundaries of object(s) that follow the general form of a biometric object associated with biometric scanner 2 in apparatus 1. However, other imaging processing methods to locate desired objects in images may also be performed, such as those described in U.S. Pat. No. 5,291,560 (Daugman), U.S. Pat. No. 5,751,836 (Wildes et al.), U.S. Pat. No. 9,280,695 (Zyzdryn et al.), U.S. Pat. No. 6,983,062 (Smith), or U.S. Pat. No. 7,277,562 (Zyzdryn). An object may be a finger or fingertip (such as described in detail below in connection with FIGS. 4 and 8), or features of the eye or face (such as described in detail below in connection with FIG. 11) in the case of iris or facial scanners, respectively, providing biometric scanner 2.

At step 26, information or data from the PAD system 3 from each selected location scanned is analyzed by the processor 4 and/or optional computer 5. Such PAD data analysis involves the implementation of a formula that outputs a PA score that measures the possibility that the locations of the possible biometric presentation represent a true biometric or a false biometric object. By way of example, NexID (Potsdam, N.Y.), acquired by Precise Biometrics, sells a software PAD software developer's kit (SDK) that allows a customer to create software code based upon machine learning algorithms to output a PA score based upon 2D texture features in fingerprint images specific to the customer's fingerprint scanner. The PA score from a collection of biometric presentation locations, be they multiple finger scan locations, multiple iris scan locations and multiple face scan locations may be combined into a single PA score. The particular combination (or fusion) of scores or metrics depends on biometric scanner 2 and apparatus 1 performance desired. For further exemplary fusion techniques, see U.S. Pat. No. 7,747,044 (Baker et al.) or U.S. Pat. No. 8,494,829 (Teixeira).

By way of example, the PA score may have a range of 0 to 100 and the higher the score, the more likely the biometric presentation is a PA. The score thresholds that trigger a true or false PA decision (step 27) is subject to the use case for the apparatus 1. For access control to a building that is not necessarily high security or for a system that uses multi-factor authorization (for example, a fingerprint is not the only form of identification required, but an RFID badge and PIN are also required), then it may be better to set the PA threshold lower and have a higher False Accept Rate (FAR) and lower False Reject Rate (FRR). Conversely for a high-security use-case, the PA threshold may be set such that FAR is very low (i.e., less likely that a false biometric presentation will be accepted as true) with the tradeoff that FRR is higher (chance that a real biometric presentation is scored to be a false presentation). Again, dependent upon the use case, the response for a false biometric object (step 29) and the response for a true biometric object (step 28) may vary. For example, at step 29 a detection of a false biometric may sound an alarm, require the subject to pass several additional steps to prove an identity otherwise not required for a true biometric detection, or may just simply not allow the subject to pass a locked access point. For step 28, a true biometric decision most likely would mean that at least some of the next steps would involve using the biometric data scanned at step 20 or taking additional biometric data for subject identity confirmation. For example, if in step 20 only 250 ppi biometric data was taken to determine if a presentation was true or false, after determining that the presentation was true (step 27), then the biometric scanner 2 is then operated by processor 4 or computer 5 to capture a 500 ppi biometric data is in order to ascertain a biometric identity of the subject. The subject's identity may be determined by the same image data, or with recaptured higher resolution image data if needed, when step 27 has determined a true biometric object, rather than a fake one, has been presented to the biometric scanner 2. The image data for identity management may be received by a biometric security system for matching with a database of biometric stored data for a population of subjects enrolled to access identity so as to control access to physical and/or electronic environments in manner typical of identification, verification, or enrollment security systems as available by Cross Match Technologies, Inc. of Palm Beach, Fla., USA. Apparatus 1, in addition to having a system for detecting a presentation attack, may be part of, or represents, such biometric security system for identity management, where computer 5 provides software with a user interface for enabling same, and memory storing, or accesses via a network, the database.

Referring to FIG. 3, apparatus 1 is shown having biometric scanner 2 provided by an optical TIR fingerprint scanner with a PAD system 3 within a housing 50. The TIR fingerprint scanner comprises a prism 51 with a light panel 54 injecting light 57a through prism facet 55a and reflecting off of prism facet 55b. Prism 51 may be of glass, with LED illumination being provided by the light panel 54. Prism facet 55b makes up a platen 52 that object(s) or finger(s) 53 presses upon in order for the scanner to read its fingerprint. As FIG. 3 is drawn as a two-dimensional (2D) cross-section, it does not illustrate that the finger 53 may be one of multiple fingers simultaneously placed on platen 52 for fingerprint scanning. The reflected light 57b from platen 52 passes through prism facet 55c and is imaged with optics, lenses 14 and 15, onto sensor 49. Sensor 49, by way of example may be a CMOS (complementary metal-oxide semiconductor) or a CCD (charge-couple device) detector. Fold mirrors 58a and 58b are optionally present for the purposes of achieving a compact optical design. Sensor 49 is mounted to printed circuit board (PCB) 48 along with processor 4 that process signals from sensor 49 as well as from PAD system 3 via cable 59a. Processor 4 may also communicate with light panel 54 via cable 59b. PAD system 3 is able to scan across a certain field of view (FOV) defined by rays 56a and 56b in order to determine whether or not a biometric presentation on platen 52 is true or false. As illustrated, PAD system 3 has a FOV represented by dashed lines 56a and 56b. The PAD system 3 is observing a location or area along one of the finger(s) 53 touching platen 52 by looking through facet 55a of prism 51, but may also look through another facet of the prism 51 such as facet 55d.

Figure 4A:
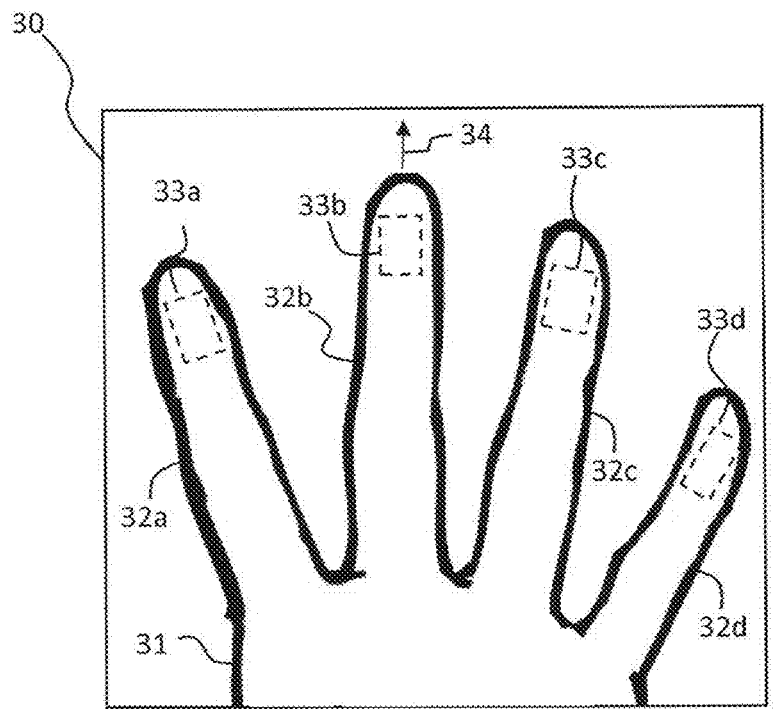
FIG. 4A depicts an example of captured image data using a fingerprint scanner of FIG. 3, where locations are identified for scanning by the PAD system.

FIG. 4A shows an example of image (or image data) 30 of finger(s) 53 of a subject captured by the fingerprint scanner of FIG. 3. Within the image, using image processing, such as gradient detection or local thresholding commonly used to determine boundaries of objects in images, processor 4 and/or optional computer 5 detects the presence of a biometric presentation 31 and further may detect the presence of one or more fingers 53 labelled 32a-d in FIG. 4A. For the purposes of directing PAD system 3, small portions of the fingerprint tip 33a-d are identified. One means of achieving this is through image processing, such as where the blob or region of the image data from the fingerprint scanner representing the finger is first differentiated from the background by establishing a grayscale threshold. The small portions of the finger 33a-d designated as possible scan areas for the PAD system 3 can be identified by first determining the directions (one direction 34 being drawn for finger 32b) of the fingers 32a-d, determining where the finger ends and its rough width, finding the center of the upper part of the finger and then defining a certain area about that center. For example, the best location to check for a PA may be 10 mm in from the tip of the finger and centered relative to the width of the fingerprint. Further, a scan with PAD system 3 a 4×4 mm area centered around this identified point may be best location to check for a PA.

Figure 5:
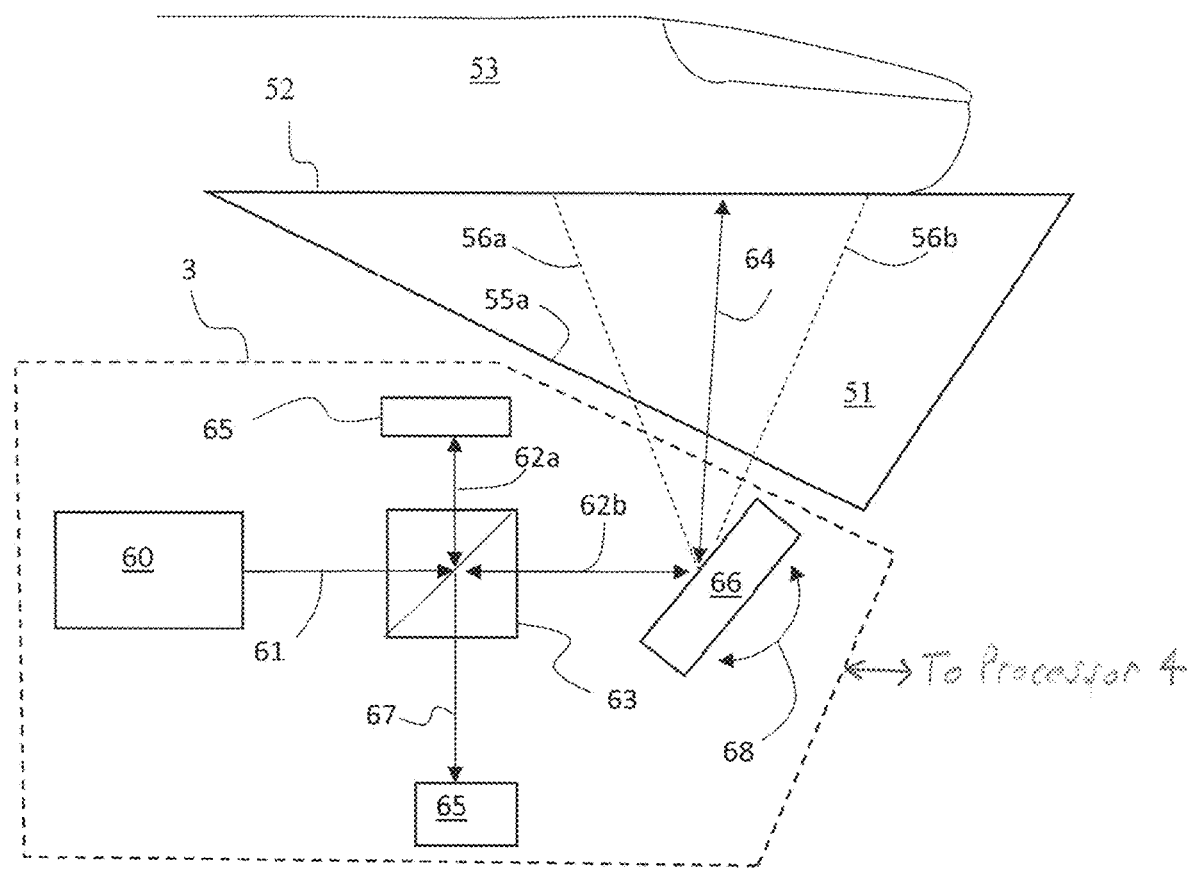
FIG. 5 is a block diagram of the PAD system of FIG. 3 utilizing optical coherence tomography (OCT) scanner with a movable mirror to direct imaging by the OCT scanner to selected areas within the field of view of the biometric scanner upon which the fingers of FIG. 4A are disposed.

Referring to FIG. 5, the PAD system 3 of FIG. 3 is shown in more detail with respect to the prism 51 of the fingerprint scanner of FIG. 3 providing the biometric scanner 2. PAD system 3 of FIG. 5 scans within the FOV (such as a first location 33a of FIG. 4A) of the prism-based fingerprint scanner of FIG. 3. The PAD system 3 comprises an OCT scanner head that is composed of a superluminescent light-emitting diode (SLED) source 60 with an optical output beam 61 that is split into two beams 62a and 62b via a beamsplitter 63. The reference path travelled by beam 62a reflects off of a mirror 65 while the object path travelled by object beam 62b strikes another mirror 66, which is mounted for rotation in the direction shown by arrows 68, such that the reflected object beam 64 can sweep the FOV of the PAD system 3 given by dashed line boundaries 56a and 56b. The light reflected back from the finger 53 touching platen 52 (traveling the same path as beam 64) reenters the PAD system and is combined by beam splitter 63 with light from the reference path into a single beam 67 that is imaged onto a sensor 69.

To enable rotating motion, mirror 66 is mounted on a mechanism, such as a galvanometer, that enable processor 4 to operate position control electronics (e.g., motor(s), or actuator(s)) of the galvanometer directing mirror 66 to scan a desired location (or area) along platen 52. Although FIG. 5 is drawn in two-dimensions (2D), the mirror 66 may allow for tip and tilt, thereby allowing for beam 64 to scan a 2D area of platen 52 rather than one-dimension (1D). While the movement mechanism may consist of a single mirror 66 of a mirror galvanometer scanner, one or multiple mirrors may be mounted to tip-tilt galvanometer(s) (such as available from Cambridge Technology of Bedford, Mass.), or two-dimensional (2D) mirrors based upon electroactive polymers (such as available from Optotune of Dietikon, Switzerland) that do not move the entire OCT measurement head, but rather just the object path of arm of the OCT scanner head as shown in FIG. 5. Such galvo mirrors for directing the FOV of an optical system are described in U.S. Pat. No. 6,714,665 (Hanna et al.) and U.S. Pat. No. 5,751,836 (Wildes et al.). Optionally, the housing or module having the PAD system 3 may mounted on a set of x-y mechanical stages to move the OCT measurement head to measure any location on the platen 52 where the biometric object may be placed by a subject. Wires or cables connect processor 4 to power and enable light source 60, as well as to control the position control electronics for mirror 66 and other electronics of the OCT scanning head.

For more detailed construction regarding OCT scanning heads, refer to Cheng and Larin "Artificial fingerprint recognition by using optical coherence tomography with autocorrelation analysis," Appl. Opt. 45, pp. 9238-9245 (2006), U.S. Pat. No. 8,687,856 (Bower et al.), U.S. Pat. No. 5,493,109 (Wei), U.S. Pat. No. 6,057,920 (Fercher et al.), and U.S. Pat. No. 5,321,501 (Swanson et al.). OCT scanner systems which may be adapted for apparatus 1 may be used, such as the Callisto 930 nm spectral domain OCT imaging system sold by ThorLabs, Inc. of Newton, N.J., USA. OCT systems such as Callisto that operate in the near Infrared Reflectance (NIR) are good for imaging beneath the surface of human tissue since human tissue is penetrated more easily by NIR wavelengths than visible wavelengths. Note that OCT operates based upon the principle of interference and because of the very short coherence length of its broad wavelength source, typically a SLED, it is able to achieve high depth resolution in its scanning. By scanning the reference path (meaning changing the optical path length traversed by beam 62a between reference mirror 65 and beam splitter 63) to match the object beam path (meaning the optical path traversed by beam 62b and 64 and scattered back off of a particular depth within object 53 on platen 52) the system 3 can scan and observe reflections at different depths within object 52. This scanning may be performed by mounting the reference mirror 65 to a high-precision (precision on the order of 10 microns or better) motion stage such as those operated with a PZT motor or a voice coil. For the particular system diagrammed in FIG. 5, the optical path beam 64 traverses from mirror 66 to object 53 changes as a function of the tilt angle of mirror 66. Consequently, in order to scan a given distance into object 53, the range of motion reference mirror 65 must traverse must allow for said distance into object 53 as well as any optical path differences that result from scanning across the PAD FOV designated by dashed lines 56a and 56b.

The PAD system 3 of FIG. 5 may thus be directed to scan each of locations 33a-33d along the fingers of FIG. 4A. However, all of the locations 33a-33d may not require scanning by the PAD system 3. For example, the scanning (step 25) may be performed sequentially and if after scanning two locations and finding conclusive evidence that the two scanned areas are either true biometrics or false biometrics, the process flow may move to the next step. Alternatively, if the first two scanned areas give weak evidence one way or another that the biometric presentation is true or false, maybe a third or even fourth location is designated as being required for the PAD system 3 to scan. Alternatively, the processor 4 or optional computer 5 could in the case of fingerprints determine that the little finger is not to be scanned by the PAD system 3 and only fingertip portions of the first two or first three fingers are to be scanned.

FIG. 6 shows the biometric scanner 2 being a TFT fingerprint scanner 70 which may be provided in housing 50 instead of prism based fingerprint scanner of FIG. 5. For purposes of illustration, housing 50, and the other components of apparatus 1, such as processor 4 and optional computer 5, are not shown. The PAD system 3 has the same OCT head of FIG. 5, but now a scanning (refractive) lens (or optics) 71 has been added and positioned such that the focal point of refractive lens 71 is at a near the center of rotation of mirror 66.

The refractive lens 71 configuration has the advantage that the path length of the object beam stays constant as different areas of the platen 52 are scanned as well as keeps the angle of incidence of the scan swept beam 64 roughly constant across the platen. Keeping the object beam path constant or near constant is a strong advantage in OCT scanning since OCT works on an interferometry principle and short coherence length source 60 such as a SLED (short coherence length being required to achieve good z-resolution. As explained earlier, the range of motion required of reference mirror 65 is related to the amount of change in the optical path length of the OCT's object path when scanning across the OCT's FOV as well as the amount of depth desired to scan within the object 53 on platen 52. Consequently, if the optical path length of the object path does not change substantially over the scan of mirror 66, then the motion requirements on reference mirror 65 are reduced. Note that a constant optical path length (OPL) during scanning can also be achieved with a refractive mirror in place of refractive lens 71, for example a parabolic mirror where mirror 66 would be placed at its focus. Alternatively, a refractive lens 71 may be replaced with a Fresnel lens. While use of a Fresnel lens does not achieve a constant OPL during a scan, a Fresnel lens has the advantage that it is more compact, lighter weight and typically less expensive than a refractive lens.

TFT-based fingerprint scanner 70 is drawn with a backplane 72 which is preferably an optically transparent material such as glass. The TFT-based fingerprint scanner 70 also contains sensitive areas of the pixel 74 that respond to light or electrical properties such as capacitance that are being used to sense and image fingerprint(s) 53 placed on platen 52. The TFT-based fingerprint scanner 70 also contains optically transparent regions 75 in between the sensitive areas 74 where the light 64 from the PAD system 3 can transmit through to the platen 52 and obtain image depth information about the finger(s) 53. For the case of TFT pixels 74 being sensitive to capacitance, the backplane 72 may simply be a homogenous glass sheet, typically 0.5 to 1.0 mm in thickness, such as that made by Corning (Corning, N.Y.). In the case of TFT pixels 74 being sensitive to light, backplane 72 may consist of a similar glass sheet, but then also include means of illumination that can transmit through transmissive areas 75, reflect/scatter off of fingerprint ridges of object 53 on platen 52 and be detected by pixels 74. Such illumination means, may by way of example be an OLED display that has areas of transmission between OLED illumination pixels that coincide with transmission areas 75, thereby allowing beam 64 to transmit through the fingerprint scanner 70 and interact with object 53 on platen 52. Coating 73 is a protective coating that covers the pixel transistors of the TFT sensor as well as the sensitive areas 74 of the pixels and protects the TFT sensor from mechanical abrasion as well as electrostatic discharge (ESD).

Figure 4B:
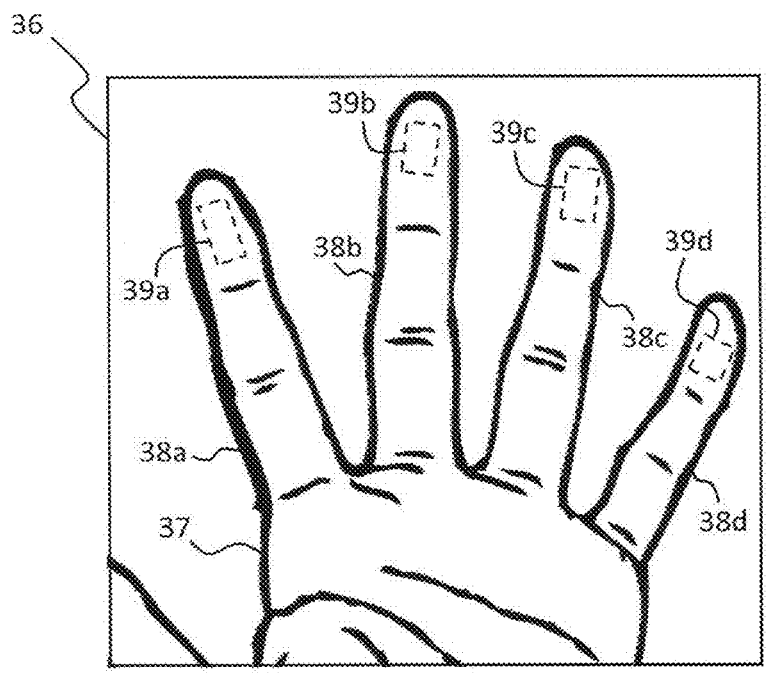
FIG. 4B depicts an example of captured image data using a non-contact fingerprint scanner providing the biometric scanner of FIG. 1, where locations are identified for scanning by the PAD system.

The image data 30 of FIG. 4A may also be provided from TFT fingerprint scanner 70, whether said TFT scanner has optical or capacitive sensitive pixels. FIG. 4B depicts an example of captured image data 36 using a non-contact fingerprint scanner which can provide the biometric scanner 2 of FIG. 1. As stated earlier, examples of non-contact fingerprint scanners which may be used for biometric scanner 2 are optical scanners available from Advanced Optical Systems (Huntsville, Ala.) and structured light non-contact scanners available from FlashScan3D (San Antonio, Tex.). Image data 36 may be stored is an optical image (derived from a single image or derived from multiple images) captured by the non-contact fingerprint scanner. As in FIG. 4A, the likely biometric presentation 37 of FIG. 4B is identified by processor 4 and/or optional computer 5, and to identify likely fingers 38a-d and determine potential locations 39a-d for the PAD system 3 to potentially scan.

Figure 7:
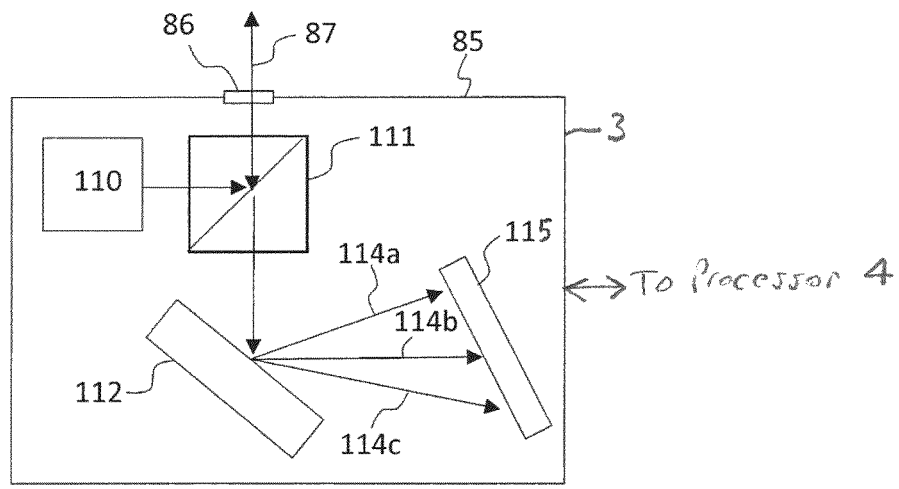
FIG. 7 is a block diagram of the PAD system in the apparatus of FIG. 1 having a spectral sensing system providing a spectrometer.

Referring to FIG. 7, another PAD system 3 of apparatus 1 is shown having a spectral sensing system, replacing the OCT scanner of FIGS. 5 and 6. PAD system 3 is in a housing 85 containing a spectrometer that capture spectral data enabling examining of a spectral signature of at one or more locations 33a-33d (FIG. 4A) of the finger(s) 53 touching platen 52 differentiating the finger(s) from being real or fake. A similar spectrometer-based PAD system may also be incorporated into a face or iris biometric scanner. A broadband source 110, for example a superluminescent diode (SLED), a tungsten bulb, an arc lamp, or a fluorescent light, is directed by a mirror or beamsplitter 111 out an aperture 86 along housing 85 towards platen 52. Upon returning, the beam 87 passes through aperture 86 or alternatively another aperture (not drawn) and reflects off of diffraction grating 112. The design of diffraction grating 112 design and the angle at which it is mounted are optimized to maximize diffraction efficiency and to achieve the spectral resolution in conjunction with pixelated optical sensor 115. Rays 114a-c represent rays of three different wavelengths that have been split from wide spectral bandwidth beam 87. By way of example, the spectrometer may a commercial spectrometer, such as sold by Hamamatsu (Shizuoka, Japan). By way of example, the C12666MA Hamamatsu compact spectrometer head is approximately 20×12.5×10 mm in size, weighs 5 gm, has a spectral response range of 340 to 780 nm and a spectral resolution of 15 nm and therefore represents a light compact spectrometer head option that could be implemented into apparatus 1. If a broad spectrum analysis of the object provided by one of finger(s) 53 upon platen 52 is not required to determine if the object is a PA or not, and only spectral information of the object at a couple or a few wavelengths is sufficient, then discrete wavelength LEDs may be provided in housing 85 to illuminate the object and to analyze the return signal of the object at each of those discrete wavelengths. Discrete wavelength analysis may be conducted with sequential illumination or in parallel through use of sensor 115 having color filters that distinguishes between each of the discrete wavelength LEDs. Measured spectral data received and stored in memory by processor 4 and/or optional computer 5 are analyzed to determine a fake presentation in accordance with spectral signature of the biometric object expected to be in view of the biometric scanner. Such analysis of spectral data may also or instead be performed as described in A. Beisley "Spectral Detection of Human Skin in VIS-SWIR Hyperspectral Imagery without Radiometric Calibration", Dept. Air Force Thesis 2012.

Figure 8:
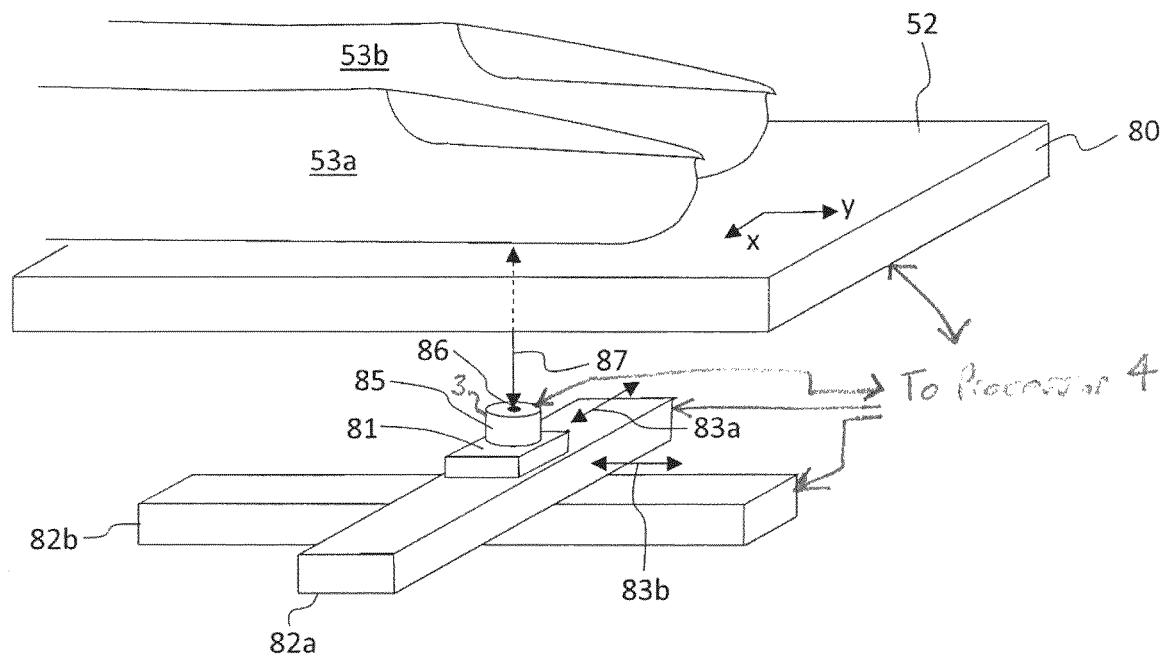
FIG. 8 is a diagram showing the PAD system of FIG. 7 mounted on a movable sled with respect to a biometric scanner provided by a TFT-based fingerprint scanner of FIG. 6.

In order to position housing 85 of PAD system 3 of FIG. 7 to locations or areas along platen 52, FIG. 8 shows housing 85 mounted on a movable sled 81 placed underneath the platen 52 of a multi-finger fingerprint scanner 80 providing biometric scanner 2. Fingerprint scanner 80 could be a TFT fingerprint scanner as depicted in FIG. 6 or an optical TIR-based fingerprint scanner as illustrated in FIG. 3. The requirement of the fingerprint scanner 80 is that there are sufficient regions of optical transparency that optical beam 87 can transmit through the scanner and interact with finger(s) 53 on platen 52 shown in FIG. 8 as fingers 53a and 53b. Sled 81 is mounted to a linear motorized stage 82a that moves sled 81 in a direction along bidirectional arrow 83a. While such scanning in a single dimension may be sufficient for some applications, a second orthogonal dimension may be needed. To achieve this, linear stage 82a may be mounted to linear stage 82b, thereby allowing linear stage 82a to moved bidirectionally along direction 83b which is preferentially orthogonal to direction 83a. Control lines from processor 4 are provided to electronics of PAD system 3 in housing 85, to enable the processor 4 and/or optional computer system 5 for controlling spectrometer operation, as well as to control linear stages 82a and 82b to control position of housing 85 with respect to platen 52. Optionally, rather than using movable sled 81, optical beam 87 emanating from aperture 86 of housing 85 of PAD system 3 could be swept across the two-dimensional (2D) platen 52 using a pair of galvanometric mirrors that would supply the proper tip/tilt control to sweep the platen 52, each galvanometric mirror may be same or similar to that of mirror 66 described earlier.

In the case of FIG. 8 for example showing a two-finger scanner, there may be high confidence that along a certain line across the platen 52, both fingerprint tips can be probed by the PAD system 3. For example, where fingers 53a and 53b represent the simultaneous presentation of the same finger from left and the right hand, such fingers would have the same length and hence scanning along a line running in x and at a certain y axis value y0, the fingertips of both of these fingers can be analyzed for presence of a PA. Alternatively, the fingerprint scanner may operate with the index and middle finger from the same hand. If a PAD system 3 scans along an approximately 45 degree line in the x-y plane than the fingertips of both such fingertips could be analyzed for the presence of a PA. For other applications, for example a 4-finger fingerprint scanner, there is no guarantee that a single line in the x-y plane will pass through all presented fingertips and hence the two-dimensional coverage of platen 52 using linear stages 82a and 82b is preferred. Such enables housing 85 to be swept in one or two dimensions across platen 52 to locations under control of processor 4 or optional computer 5 for scanning.

The directing of PAD system (step 24 of FIG. 2) can thus be performed by the entire physical PAD housing or module moving, such as housing 85, a portion of the PAD system moves, such as mirror 66, or just to the locations that the PAD scans are being directed to. In the latter case, PAD system 3 may be an OCT measurement/scanner head of FIG. 5 without movement only capable of performing an A-scan where the FOV is only 100 µm in x-y area of object contacting the platen of the fingerprint scanner, but 1 mm depth into whatever object touches the platen. However, moving the entire OCT head or the object beam with one or more galvanometer or similar functioning mirror scanners is preferred. While fingerprint scanners providing biometric scanner 2 are shown FIGS. 3 and 6, which are optical-prism based or TFT fingerprint scanners, other types of contact or non-contact finger scanners may be used as described earlier.

Referring to FIG. 9, apparatus 1 is shown having a biometric scanner 2 provided by an iris and/or face scanner within housing 6 with PAD system 3 directed to selected locations into the FOV of the iris and/or face scanner. As described earlier, apparatus 1 is comprised of biometric scanner 2 and PAD system 3 that are connected via cables 7b and 7a respectively to processor 4 which in turn may be connected to computer 5 via cable 8 or wirelessly. The FOV of biometric scanner 2 is represented by dashed lines 90a and 90b that for a single iris scanner encompasses a larger area than that of a single iris, that for a dual iris scanner encompasses a wider FOV than two eyes and for a face scanner, encompasses a wider FOV than just a single head of a person. The PAD system 3 also has a certain FOV designated by dashed lines 91a and 91b that it can scan, but may only be directed to look at only certain locations. Such locations may be, for example, the iris 96, sclera 95, the nose 97, cheekbones 99, or mouth 94.

Figure 10:
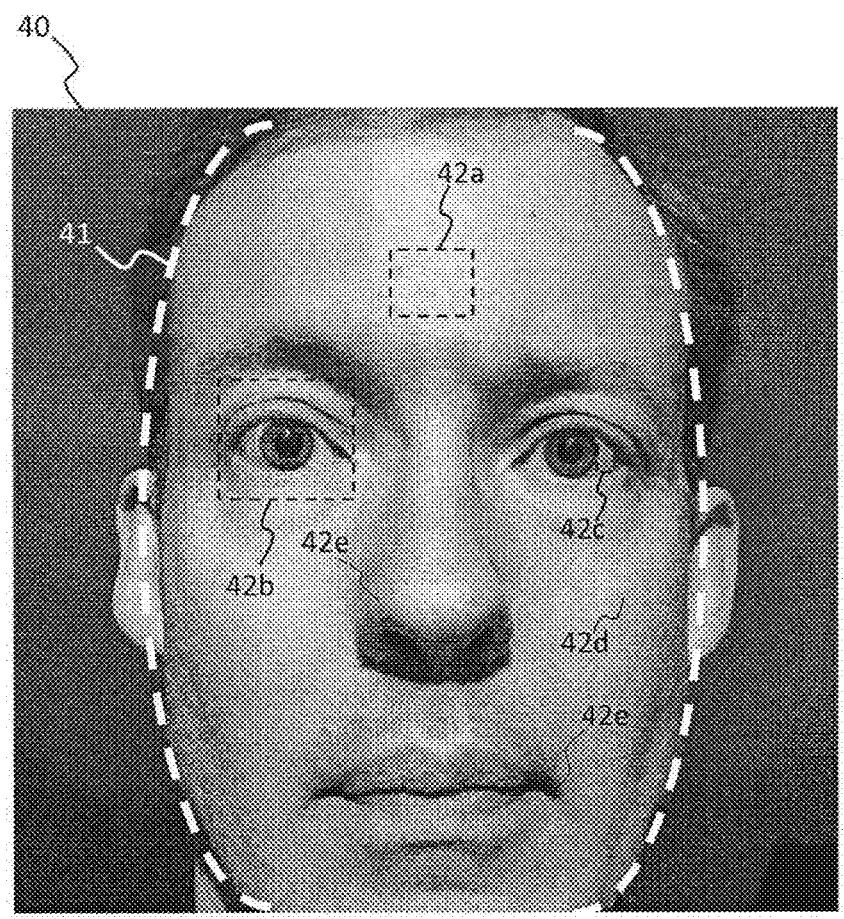
FIG. 10 depicts an example of captured image data using the face or iris scanner of FIG. 9, where locations are identified for scanning by the PAD system.

In FIG. 10, an example of image data 40 collected from the scanner of FIG. 9 is shown having both eyes of a subject. Processor 4 and/or optional computer 5 analyzes image data 40 to determine the presence of a face 41 and certain locations 42a-f are determined as location options for the PAD system 3 to scan. As way of example, possible locations within the face biometric presentation to scan may include a region of skin 42a, an eye 42b, a portion of the sclera 42c, the cheekbone 42d, nose/nasal area 42e, and mouth 42f. For face artifacts where a subject is trying to hide their identity with a mask or prosthetics, it is less likely that the iris or sclera will be changed, slightly more likely that the eyelid shape might be altered, but more likely that prosthetics that alter the facial geometry such as features of the nose, cheekbone or mouth might be altered since these are some key features that facial recognition systems measure and quantify. It is preferred that the scanning of PAD system 3 be directed towards areas of selected locations having the highest probability of identifying a false face presentation.

Figure 11:
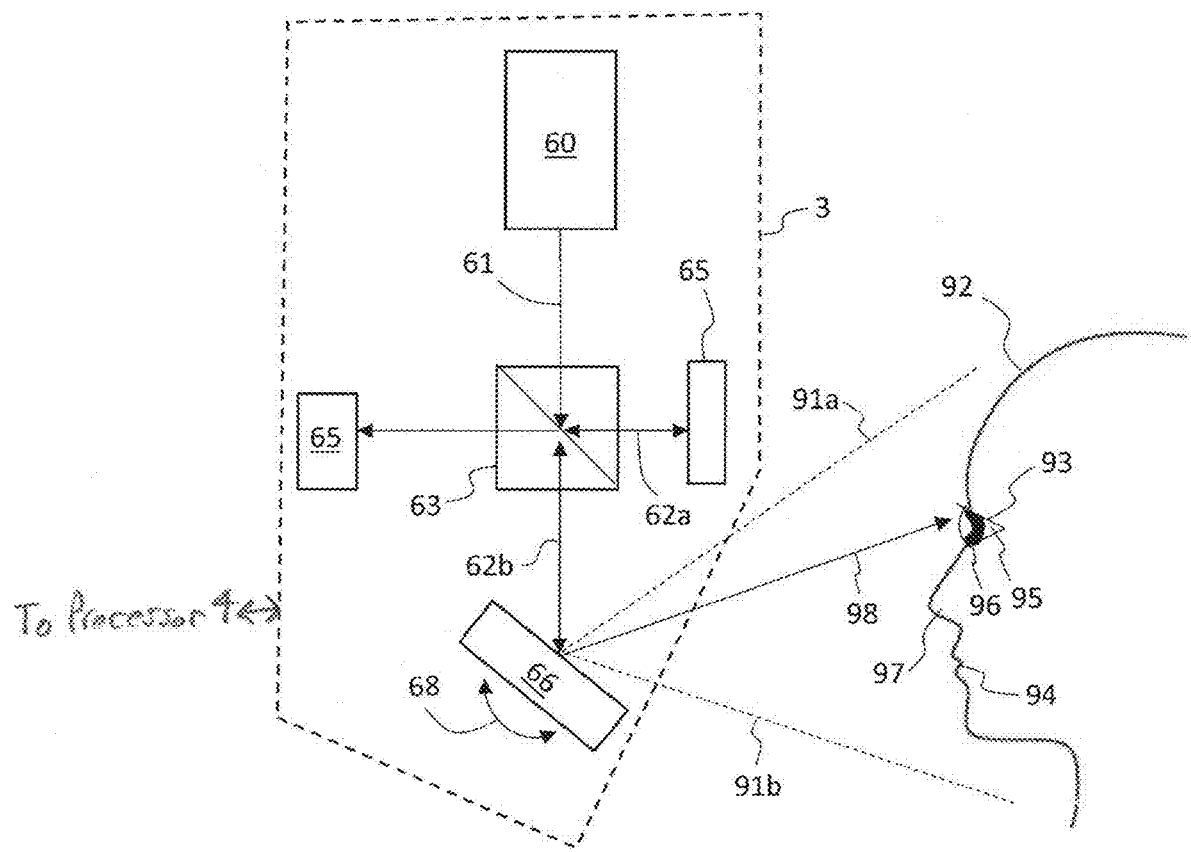
FIG. 11 is a block diagram of the PAD system of FIG. 9 utilizing an OCT scanner with a movable mirror.

As depicted in FIG. 11, the PAD system 3 of FIG. 9 is illustrated so that it consists of an OCT scanning head such as the one discussed in reference to FIG. 5. Depending upon the form of PAD modality used and the FOV the PAD system, different locations 42a-42f within the presentation of the human head or eye(s) may be checked for the possibility of a PA. By way of example, for a system which captures a single or dual iris biometric, the PAD system 3 may be directed to scan one or more of an iris 95, a portion of the sclera 96, or the entire eye 93. The PAD system 3 may scan these locations sequentially as well, for example scanning the iris first and if the PA test is inclusive, scan the sclera or other parts of the eye. For a face biometric scanner providing biometric scanner 2, the PAD system 3 may be directing each beam 98 to analyze, by way of example, one or more of the nose 97, mouth 94, and cheekbones of the presented face in order to determine whether or not the skin is consistent with human skin or if it has a thick covering such as a prosthetic that is covering and changing the true facial features of a subject. Analysis of the OCT signal for face or iris can be conducted similarly as Cheng and Lain (cited earlier) is performed for analysis of a finger with OCT, namely the use of autocorrelation signal analysis.

Figure 12:
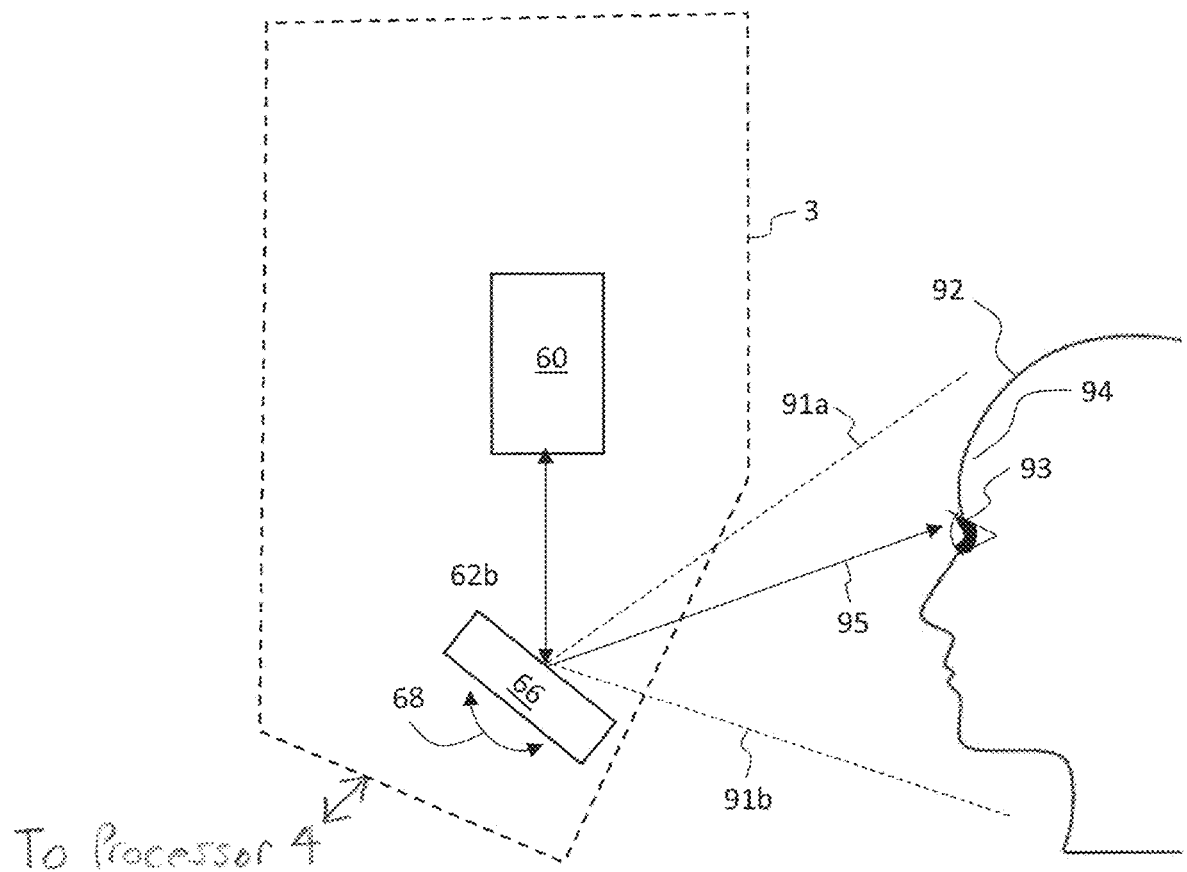
FIG. 12 is a block diagram of a PAD system of FIG. 9 utilizing a laser scanning system.

As depicted in FIG. 12, another PAD system 3 of FIG. 9 for a laser scanning system is illustrated having an optical laser scanner head comprising a light source 120, a scanning mirror 125, and an optional camera 124 providing information in the form of 2D or 3D profilometry data to processor 4. Light source 120 has an emitted optical beam 121 that reflects off of scanning mirror 125 where such mirror is capable of being moved in bidirectionally as denoted by arrow 126 (as well as out of the plane of the figure to allow a second dimension of scanning). Mirror 125 may be same types of movable mirror 66 or mirrors as discussed earlier in reference to FIGS. 5 and 11. Mirror 125 may be capable of being moved in one axis or two axes, thereby enabling either tip or tip/tilt motion and the mirror mechanics may be those of a galvanometer. Mirror 125 is thereby able to direct a reflected beam 122 within field-of-view designated by dashed lines 91a and 91b towards the biometric presentation 92 at the locations identified by the processor 4 or optional computer 5 (step 24 of FIG. 2) as locations with the best chance of identifying a PA. The interaction point at which beam 122 hits biometric presentation 92 is detected either by optional optical camera 124 (that has field-of-view designated by dashed lines 128a and 128b) or by the imaging system of biometric scanner 2 of FIG. 9. For detail regarding profilometers based upon laser scanning, the subject matter contained within the following patents are hereby incorporated by reference: Ulmer et al., "Three-dimensional profilometer" U.S. Pat. No. 9,163,936, and Clary et al., "High-precision optical imaging systems and related systems," U.S. Pat. No. 6,940,891. It should be noted that U.S. Pat. No. 9,163,936 refers to applications of laser scanning profilometers that include the measurement of the human sclera for purposes of constructing a scleral lens or an ocular surface prosthetic. Thus, laser scanner of FIG. 12 obtains information in the form of profilometer data at one or more locations which differentiates the eye scanned from being fake and real. Light source 120 in FIG. 12 may be replaced with a series of collimated LEDs, or a broadband optical source and a movable diffraction grating to select certain wavelength bands from the broadband optical source if spectral analysis of the biometric presentation 92 is desired for PAD rather than 3D analysis of the biometric presentation as can be achieved with the scanning laser spot, previously discussed. For any optical scanning of a biometric presentation that involves the eyes of a subject, it is preferred that the scanning is performed with light of wavelengths that are invisible or at least minimally detectable by the human eye and the optical powers used for such a system ensured to be eye-safe, for example satisfying IEC 62471 Photobiological Safety of Lamps and Lamp Systems.

To enable operation of the apparatus 1, pixel locations on the two-dimensional biometric image from the biometric scanner 2 are correlated spatially in memory (such as a look up table) of the processor 4 with FOV of the PAD system 3, so that FOV of the PAD system 3 can be moved at or along locations in the FOV of the biometric scanner 2 as described above. It is preferred that calibration of such spatial correlation, if needed, occurs at the factory and not in the field. By way of example, for a contact fingerprint scanner providing biometric scanner 2, a calibration target can be placed onto the fingerprint platen much in the same way that fingerprint scanners are certified currently for the FBI. These targets can contain lines of specific spatial frequencies as well as marks located at specific points in order to calibrate and adjust the imaging resolution of the biometric scanner 2 and PAD system 3 as well as their relative offsets in x, y and theta (rotation in the x-y plane between what the biometric scanner 2 may deem the x axis to be and what the PAD system 3 deems the x-axis to be). Such targets can be printed onto Mylar sheets, photographic paper or fabricated with lithographically patterned and etched chrome on glass, such as from Applied Image, Inc. (Rochester, N.Y.). Similar targets can be used for the calibration of an apparatus 1 of non-contact fingerprint scanners, iris scanners, and face scanners when providing biometric scanner 2 where the targets are then placed in space within the FOV that the apparatus 1 is intended to operate at. Once spatially calibrated, the PAD system 3 is directed to scan along a line or an area selected in the FOV of biometric scanner 2, it should be understood that all points within that line or area are not necessarily scanned. For example, for checking the spectral signature of an object or probing into the object with an OCT beam, the designated line or area need not be imaged in a continuous spatial fashion, but for speed purposes it may be decided that a certain spatial sampling rate is more optimal such as taking scan data every 1 or 2 mm apart.

The advantage of the present invention is that unlike prior art where the entire FOV of a biometric scanner needed to be scanned for presentation attack detection, apparatus 1 enables only a small portion of the biometric scanner 2 FOV need be scanned. By way of example, consider a contact fingerprint scanner such as shown in FIG. 3, 6, or 8 having a platen 52 for capturing image data 30 (FIG. 4A) of four fingers. Per FBI Appendix F certification standards, such fingerprint scanner must capture at least a 3.0"×3.2" area which is equal to 61.9 cm$^2$. Referring to the finger image data 30, rather than scanning the entire area of the platen for presentation attacks (PAs), only locations (33a-d) of the fingertip are scanned by PAD system 3. If such locations 33a-d for PAD scanning and analysis are each by way of example only 4×4 mm, then together the four PAD scanned area is only 0.64 cm$^2$ and the effective time of the PAD scanning has now been reduced by nearly 100×. There is also the time savings that now processor 4 and optional computer 5 need only analyze 1% of the data that scanning the full FOV of the biometric scanner 2 would require. For the example of the PAD system 3 with an OCT scanner or head as shown for example in FIGS. 5, 6 and 11, may be directed to perform one or several A-scans at each location of the biometric presentation identified. Each OCT A-scan scans in depth into the biometric, i.e., finger or iris, presentation at a single x-y coordinate and would return signals whenever the material changes type or density because of the optical reflection at the boundaries. As demonstrated by Cheng and Lain, Appl. Opt. 45, pp. 9238-9245 (2006), a single A-scan is sufficient to reveal that an artifact has been placed over a real fingerprint (and thus it is similarly realized that a contact lens has been placed over a real iris). Though a single A-scan may be sufficient, preferably multiple A-scans, such as two to five in number, for each identified location is preferred in order to reduce the effect of any measurement noise or errors. Thus, several A-scans may be performed at each center of the fingertip location identified in FIG. 4A, resulting in a scan area reduction by a factor of 1,000× to 10,000×, thereby significantly increasing the speed of the PAD execution in apparatus 1. The same benefit would occur in iris or face scanner providing biometric scanner 2 of FIGS. 9 and 11 using locations 93, 95 and 96, or 42a-f of FIG. 10. As stated earlier in connection with FIG. 2, the particular location(s) scanned for presentation attack detection is based on the particular application and types of analysis at step 26 used in determining that a true/false biometric (steps 27-29) is being presented.

In summary, presentation attack detection operative in PAD system 3 may contain one or more PAD technologies as appropriate for the biometric modality being analyzed (e.g., fingers, face, iris, or other biometric features associated with biometric detection by biometric scanner 2). For example, for an apparatus 1 to scan fingerprints, the PAD system 3, by way of example, may include one or more of the following technologies to determine a true versus a false fingerprint: optical coherence tomography (OCT), as described in Cheng and Larin "Artificial fingerprint recognition by using optical coherence tomography with autocorrelation analysis," Appl. Opt. 45, pp. 9238-9245 (2006), near IR vein recognition as described in U.S. Patent Application No. 2012/0057011 (Horng et al), and/or spectral and spatial texture optical information as described by U.S. Pat. No. 7,804,984 (Sidlauskas). Although Horng et al. does not describe the use of IR vein recognition for PAD, it describes a system for scanning an IR image of the finger, extracting the vein pattern from the finger and determining vein feature points and distances to be used for identification management. The PAD system 3 may therefore contain an IR imager of the type described in Horng et al. that is used in conjunction with a biometric scanner 2 that is a fingerprint scanner. Although the fingerprint may be used for identification management, the PAD system 3 may be used to scan identified locations of the finger for the presence of veins. If no veins are found, or the vein pattern collected is found to inconsistent with those of humans (for example the spatial frequency, size of veins, type and number of branch points are different) than a PA may be determined.

For the case where the biometric scanner 2 is examining the iris or face, the PAD system, by way of example, may include one or more of the following technologies to determine a true versus a false iris or face presentation: OCT, such as described by U.S. Pat. No. 5,493,109 (Wei), the use of optical polarization analysis and structured light imaging as described by International PCT Publication No. WO 01/01329 A1 (Seal et al.), and the examination of veins of the eye, such as described by U.S. Pat. No. 8,768,014 (Du et al.). Although Wei does not describe the use of OCT for artifact detection, but rather for performing ocular surgery, Wei does describe an apparatus capable of imaging the internal structure of the eye. Therefore, using the apparatus taught by Wei in the examination of an iris presentation, and not seeing the structure (e.g., front and back of cornea lens, the lens that sits behind the cornea, etc.) that is known to be part of a human eye would therefore be a means of determining the presence of an iris PAD. Likewise Du does not teach the use of an optical sclera imaging apparatus for artifact detection but rather teaches the use of the apparatus for identification by matching vein patterns captured in the sclera with those of previously enrolled subjects. The same apparatus described in Du can be used in a PAD system 3 and that if no veins are discovered in the eye, or vein patterns that are not consistent with those of a human (e.g., veins or perceived vein patterns that have anomalous spatial frequency components compared to those known to be typical of the frequency power spectrum of those for humans), then the presence of an artifact is highly likely.

Where biometric scanner 1 is a fingerprint scanner, the PAD system 3 is preferably an OCT scanner that is capable of scanning at least part of the FOV of the fingerprint scanner. The OCT scanner is configured so that it can scan not just at the surface of the object but also a certain depth inside of the surface. The capability of scanning into the interior of the object is for the purposes of being able to identify the object as being a true or a false presentation of a fingerprint as has been discussed by U.S. Pat. No. 8,687, 856 (Bower et al.), as well as by Cheng and Larin "Artificial fingerprint recognition by using optical coherence tomography with autocorrelation analysis," Appl. Opt. 45, pp. 9238-9245 (2006). OCT scanner providing PAD system 3 is also described in the following patents which is incorporated herein by reference: U.S. Pat. No. 5,493,109 (Wei et al.), U.S. Pat. No. 6,057,920 (Fercher et al.), and U.S. Pat. No. 5,321,501 (Swanson et al.).

Unlike the prior art, the PAD analysis is directed towards specific areas of the biometric scanner's FOV. Although U.S. Pat. No. 6,714,665 (Hanna et al.) refers to a wide FOV camera that finds a face and then uses a narrow FOV camera that is directed to the face location found by the wide FV camera, it is not for the purpose of identifying a false presentation, but rather for locating an iris in a large scene for only the purposes of biometric identification.

In FIG. 1, the FOV of the PAD system 3 is directed based upon the location of the biometric presentation sensed by biometric scanner 2 and analyzed by processor 4 and optional computer 5. The FOV of the PAD system 3 is directed to one or more locations (each having to a volume of space in the case of OCT) where the biometric presentation is expected to be. The locations may be represented by a two dimension 2D (e.g., (x,y)) or three-dimension 3D (e.g., (x,y,z)) set of coordinates and these location representations may include coordinates of single points, pairs of points representing a line, sets of three points representing a plane or an area to scan within, or sets of four or more points that represent an area or a volume to scan. For the scanning of areas or volumes, the locations may also be described by a mathematical formula with a given set of parameters rather than a set of points (for example the PAD system 3 may receive the instructions that the scan area is circle with a given center coordinate and a radius). Note that for a PAD system 3 that scans naturally in a volume (for example OCT), the processor 4 or optional computer 5 may direct the PAD system 3 to scan certain volumes or may just give the coordinates or topology of a 2D area to scan (which may require all x, y, z coordinates to define) and the OCT scan that across the specified 2D area location will scan a certain depth.

Variations and modifications in the apparatus, system, and method for biometric security, and in particular to, directing presentation attack detecting in biometric scanners, as illustrated herein will undoubtedly become apparent to those skilled in the art. Accordingly, the above description should be taken as illustrative and not in a limiting sense.

The invention claimed is:

1. An apparatus for biometric security comprising:
a biometric scanner for capturing image data over a first field of view, the image data representative of one or more biometric objects associated with a subject;
a presentation attack detection system comprising a scanning head having a second field of view smaller than the first field of view; and
one or more processors configured to utilize said image data received from said biometric scanner to select one or more locations within the first field of view indicative of a potential presence of biometric features, the selected one or more locations collectively comprising a fraction of the first field of view, direct said scanning head of said presentation attack detection system to scan said selected one or more locations to collect information about the potential presence of biometric features at said selected one or more locations, and to determine in accordance with said collected information when said first field of view contains a possible fake presentation to said biometric scanner.

2. The apparatus according to claim 1 wherein said second field of view overlaps at least a portion of said first field of view, and said first and second fields of view are spatially correlated with each other for enabling said one or more processors to direct said scanning head of said presentation detection system to scan said selected one or more locations.

3. The apparatus according to claim 1 wherein said biometric scanner is one of a fingerprint scanner, an iris scanner, or a face scanner, and said one or more objects in the first field of view of the image data captured by said biometric scanner comprise at least one or more fingertips, one or more irises, or a face, respectively.

4. The apparatus according to claim 1 wherein said scanning head comprises an optical coherence tomography imager for scanning said selected one or more locations, and said one or more processors are configured to receive said image data from the optical coherence tomography imager.

5. The apparatus according to claim 4 wherein said biometric scanner is a fingerprint scanner, said one or more biometric objects are one or more fingers, and said selected one or more locations are along at least one fingertip of said one or more fingers.

6. The apparatus according to claim 4 wherein said biometric scanner is an iris or face scanner and said one or more biometric objects comprise features associated with a face or one or both eyes of the subject.

7. The apparatus according to claim 4 wherein said optical coherence tomography imager has optics comprising a movable mirror for directing a beam to scan and collecting returned light from each of said selected one or more locations.

8. The apparatus according to claim 7 wherein said biometric scanner is a fingerprint scanner, said one or more biometric objects are one or more fingers, and said beam scans, via a platen of said fingerprint scanner, each of said selected one or more locations.

9. The apparatus according to claim 8 wherein said presentation attack detection system comprises optics having a focal point at or near a center of said movable mirror so that an optical path length to the platen is constant.

10. The apparatus according to claim 1 wherein said collected information comprises spectral data and said one or more processors are configured to receive said spectral data.

11. The apparatus according to claim 1 wherein said scanning head is movable along one or two dimensions.

12. The apparatus according to claim 1 wherein said scanning head comprises a laser scanner to collect information in the form of profilometer data at said selected one or more locations, and said one or more processors are configured to receive said profilometer data.

13. A method for biometric security comprising:
capturing image data with a biometric scanner over a first field of view, the image data representative of one or more biometric objects associated with a subject;
using said image data, selecting one or more locations within the first field of view indicative of a potential presence of biometric features, the selected one or more locations collectively comprising a fraction of the first field of view;

directing a scanning head of a presentation attack detection system to scan said selected one or more locations to obtain information about the potential presence of biometric features at said selected one or more locations, the scanning head having a second field of view smaller than the first field of view; and determining in accordance with said collected information when said first field of view contains a possible fake presentation to said biometric scanner.

14. The method according to claim 13 wherein said second field of view is spatially correlated to said first field of view.

15. The method according to claim 13 wherein said capturing step is carried out by a biometric scanner representing a fingerprint scanner, a iris scanner, or a face scanner.

16. A system comprising:
a biometric scanner for capturing first image data over a first field of view;
a presentation attack detection (PAD) module comprising a scanning head for capturing second image data over a second field of view smaller than the first field of view; and
one or more processors for directing said PAD module to scan certain locations within the first field of view indicative of a potential presence of biometric features, the selected one or more locations collectively comprising less than an entirety of the first field of view, and for determining, based on information obtained from scanning the certain locations within the first field of view with the PAD module, whether the first field of view contains a possible presentation attack to the biometric scanner.

17. The system according to claim 16 wherein the biometric scanner is one of a fingerprint scanner, an iris scanner, or a face scanner.

18. The system according to claim 16 wherein the PAD module comprises one or more of an OCT scanning system, a spectral sensing system, or a laser scanning system.

* * * * *